(12) United States Patent
Sasaki et al.

(10) Patent No.: US 11,089,221 B2
(45) Date of Patent: Aug. 10, 2021

(54) LENS DRIVING DEVICE, CAMERA MODULE AND CAMERA-MOUNTED DEVICE

(71) Applicants: Shun Sasaki, Tokyo (JP); Toshiyuki Takahashi, Tokyo (JP); Satoshi Ajiki, Tokyo (JP)

(72) Inventors: Shun Sasaki, Tokyo (JP); Toshiyuki Takahashi, Tokyo (JP); Satoshi Ajiki, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 415 days.

(21) Appl. No.: 15/776,166

(22) PCT Filed: Nov. 14, 2016

(86) PCT No.: PCT/JP2016/083719
§ 371 (c)(1),
(2) Date: May 15, 2018

(87) PCT Pub. No.: WO2017/086274
PCT Pub. Date: May 26, 2017

(65) Prior Publication Data
US 2020/0260011 A1    Aug. 13, 2020

(30) Foreign Application Priority Data
Nov. 16, 2015 (JP) .............................. JP2015-224003

(51) Int. Cl.
*H04N 5/232* (2006.01)
*G02B 7/09* (2021.01)
(Continued)

(52) U.S. Cl.
CPC ........... *H04N 5/23287* (2013.01); *G02B 7/09* (2013.01); *G02B 27/0068* (2013.01);
(Continued)

(58) Field of Classification Search
CPC ............ H04N 5/23287; H04N 5/2253; H04N 5/2254; H04N 5/23212; G02B 7/09; G02B 27/0068
See application file for complete search history.

(56) References Cited

U.S. PATENT DOCUMENTS

2010/0277604 A1* 11/2010 Sasaki ................. H04N 5/2254
                                                                 348/208.4
2011/0013283 A1*  1/2011 Sato .................... G02B 27/646
                                                                 359/557
(Continued)

FOREIGN PATENT DOCUMENTS

| JP | 2014-010287 A | 1/2014 |
| JP | 2014-085624 A | 5/2014 |
| WO | 2013/121788 A1 | 8/2013 |
| WO | 2014/076959 A1 | 5/2014 |

OTHER PUBLICATIONS

International Search Report from International Application No. PCT/JP2016/083719 dated Feb. 7, 2017.

*Primary Examiner* — Sinh Tran
*Assistant Examiner* — Zhenzhen Wu
(74) *Attorney, Agent, or Firm* — Brundidge & Stanger, P.C.

(57) ABSTRACT

Provided are a lens driving device, a camera module and a camera-mounted device which can perform translational deviation correction in addition to angular deviation correction. The lens driving device is provided with: an image-capturing unit which captures a subject image formed by a lens unit; a driving unit for translational deviation correction which performs translational deviation correction by shaking the lens unit within a plane perpendicular to an optical axis, on the basis of a detection signal from a translational deviation detecting unit that detects a translational deviation; and a driving unit for angular deviation correction which performs angular deviation correction by integrally tilting (Continued)

the image-capturing unit and the driving unit for translational deviation correction, on the basis of a detection signal from an angular deviation detecting unit that detects an angular deviation.

6 Claims, 12 Drawing Sheets

(51) Int. Cl.
 *G02B 27/00* (2006.01)
 *H04N 5/225* (2006.01)
(52) U.S. Cl.
 CPC ......... *H04N 5/2253* (2013.01); *H04N 5/2254* (2013.01); *H04N 5/23212* (2013.01); *H04N 5/232* (2013.01)

(56) References Cited

U.S. PATENT DOCUMENTS

| | | | |
|---|---|---|---|
| 2014/0036101 A1* | 2/2014 | Imanishi | H04N 5/23258 348/208.5 |
| 2014/0347506 A1* | 11/2014 | Wakamatsu | H04N 5/23258 348/208.6 |
| 2014/0362242 A1 | 12/2014 | Takizawa | |
| 2015/0229843 A1* | 8/2015 | Shimizu | H04N 5/23248 348/222.1 |
| 2016/0025995 A1 | 1/2016 | Ariji | |
| 2016/0054642 A1* | 2/2016 | Takeuchi | G03B 5/02 396/55 |
| 2016/0131923 A1* | 5/2016 | Hu | G02B 7/10 359/557 |
| 2020/0033699 A1* | 1/2020 | Kim | G03B 5/06 |

* cited by examiner

LENS DRIVING DEVICE, CAMERA MODULE AND CAMERA-MOUNTED DEVICE

TECHNICAL FIELD

The present invention relates to a lens driving device for shake correction, a camera module having a shake-correcting function, and a camera-mounted device.

BACKGROUND ART

In general, mobile terminals, such as smartphones have a small-sized camera module mounted therein. In such a camera module, employed is a lens driving device having an auto-focusing function (hereinafter referred to as "AF function (AF: Auto Focus)") for automatically focusing during the capturing an image of a subject, and a shake-correcting function for reducing irregularities of the image by optically correcting a shake (vibration) which occurs during the capturing of the image.

Lens driving devices perform automatic focusing by moving a lens part in the optical axis direction. Lens driving devices also perform shake correction by swaying a lens part in a plane orthogonal to the optical axis direction, or by integrally tilting the lens part and an image capturing part. The method in which the lens part is swayed in the plane orthogonal to the optical axis is referred to as a "shift method," and the method in which the optical axis is tilted as a "tilt method." A driving part capable of performing an auto-focusing function is referred to as a driving part for automatic focusing (hereinafter also referred to as "AF driving part" or "auto-focusing driving part") and a driving part capable of performing a shake-correcting function as a driving part for shake correction (hereinafter also referred to as "shake-correcting driving part").

The AF driving part includes, for example, a coil part for auto-focusing (hereinafter also referred to as "AF coil part" or "auto-focusing coil part") disposed around the lens part, and a magnet part for automatic focusing (hereinafter also referred to as "AF magnet part" or "auto-focusing magnet part") disposed separately from the AF coil part in the radial direction. Automatic focusing is performed by moving in the optical axis direction an auto-focusing movable part (hereinafter referred to as "AF movable part") including the lens part and the AF coil part, relative to an auto-focusing fixing part (hereinafter referred to as "AF fixing part") including the AF magnet part by using the driving force of a voice coil motor composed of the AF coil part and the AF magnet part.

The shake-correcting driving part of the shift method includes, for example, a magnet part for shake correction (hereinafter also referred to as "shake-correcting magnet part") disposed in the AF driving part, and a coil part for shake correction (hereinafter also referred to as "shake-correcting coil part") disposed separately from the shake-correcting magnet part in the optical axis direction. A shake-correcting movable part including the AF driving part and the shake-correcting magnet part is supported with a supporting member, such as a suspension wire in a state such that the movable part is separated from a shake-correcting fixing part including the shake-correcting coil part in the optical axis direction. Shake correction is performed by swaying the shake-correcting movable part in a plane orthogonal to the optical axis direction by using the driving force of the voice coil motor composed of the shake-correcting magnet part and the shake-correcting coil part (see, e.g., Patent Literatures (hereinafter referred to as "PTLs") 1 and 2).

In the shake-correcting driving part of the tilt method, meanwhile, the shake-correcting movable part includes the AF driving part and the image capturing part, and is supported with a supporting member having a biaxial gimbal mechanism in a state such that the movable part is separated from a shake-correcting fixing part in the optical axis direction. Shake correction is performed by rotationally swaying the shake-correcting movable part by using the driving force of the voice coil motor composed of the shake-correcting magnet part and the shake-correcting coil part (see, e.g., PTL 3).

CITATION LIST

Patent Literature

PTL 1
WO2013/121788
PTL 2
Japanese Patent Application Laid-Open No. 2014-85624
PTL 3
Japanese Patent Application Laid-Open No. 2014-10287

SUMMARY OF INVENTION

Technical Problem

As described above, shake correction is conventionally performed by the shift method or the tilt method, and both methods correct an angular shake from the tilt of the optical axis relative to an image capturing surface. A translational shake from the movement of the optical axis parallel to an image capturing surface rarely affects image capturing in general, and there is only a small need for correcting such a shake. As higher functions are achieved, however, there may be more occasions when a high-magnification image capturing, such as macro photographing is performed, and thus a translational shake is also preferably reduced.

An object of the present invention is to provide a lens driving device, a camera module and a camera-mounted device which are capable of angular shake correction and also translational shake correction.

Solution to Problem

A lens driving device according to one aspect of the present invention includes:

an image capturing part for capturing a subject image which is imaged using a lens part;

a driving part for translational shake correction (hereinafter also referred to as an "translational shake-correcting driving part"), which is configured to correct a translational shake by swaying the lens part in a plane orthogonal to an optical axis based on a detection signal from a translational shake detection part for detecting the translational shake; and a driving part for angular shake correction (hereinafter also referred to as an "angular shake-correcting driving part"), which is configured to correct an angular shake by integrally tilting the image capturing part and the translational shake-correcting driving part based on a detection signal from an angular shake detection part for detecting the angular shake.

A camera module according to one aspect of the present invention includes: the lens part; and the lens driving device.

A camera-mounted device according to one aspect of the present invention is an information device or a transporting device, and includes the camera module.

Advantageous Effects of Invention

The present invention is capable of angular shake correction and also translational shake correction.

DESCRIPTION OF EMBODIMENTS

In the following, embodiments of the present invention will be described in detail with reference to the drawings.

Figure 1A:
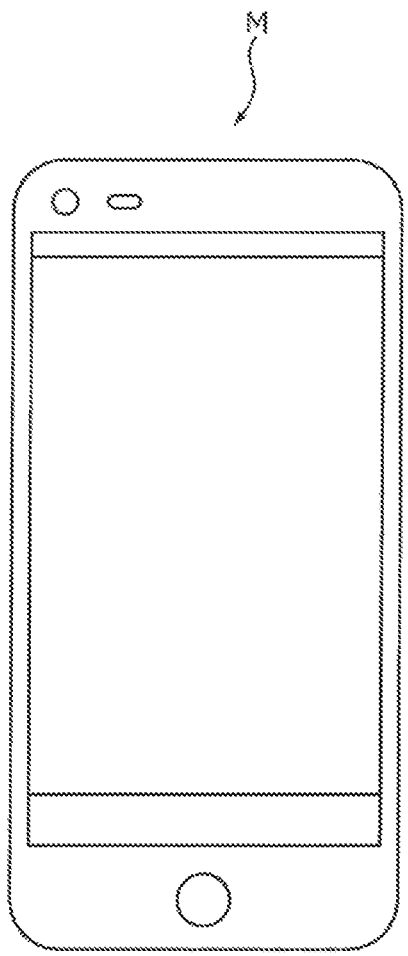
FIGS. 1A and 1B illustrate a smartphone having a camera module according to an embodiment of the present invention mounted therein.
Figure 1B:
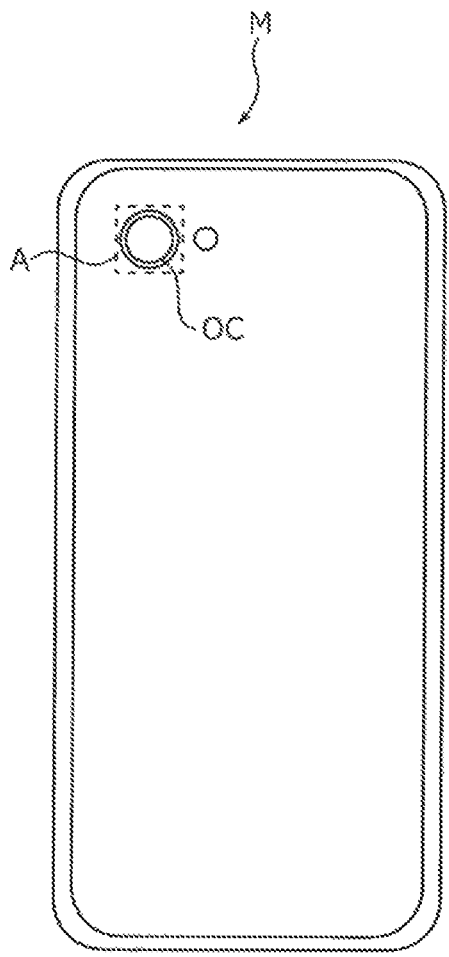

FIGS. 1A and 1B illustrate smartphone M (camera-mounted device) having camera module A according to an embodiment of the present invention mounted therein. FIG. 1A is a front view of smartphone M, and FIG. 1B is a back view of smartphone M.

Smartphone M has camera module A mounted therein as, for example, rear-facing camera OC. Camera module A is provided with an auto-focusing function and a shake-correcting function, and capable of automatic focusing during the capturing an image of a subject, and capturing of an image without image blurring by correcting a shake (vibration) which occurs during the capturing of the image.

Figure 2:
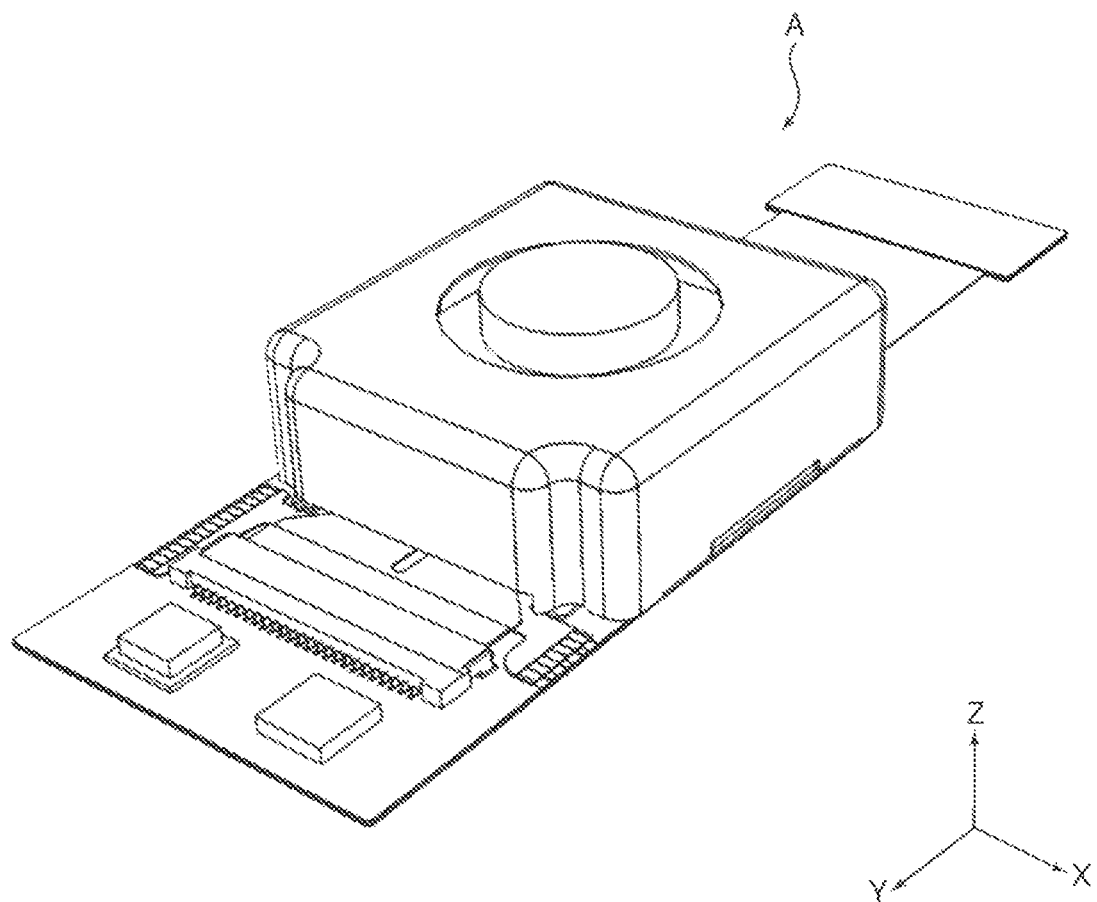
FIG. 2 is a perspective view of an external appearance of the camera module.
Figure 3:
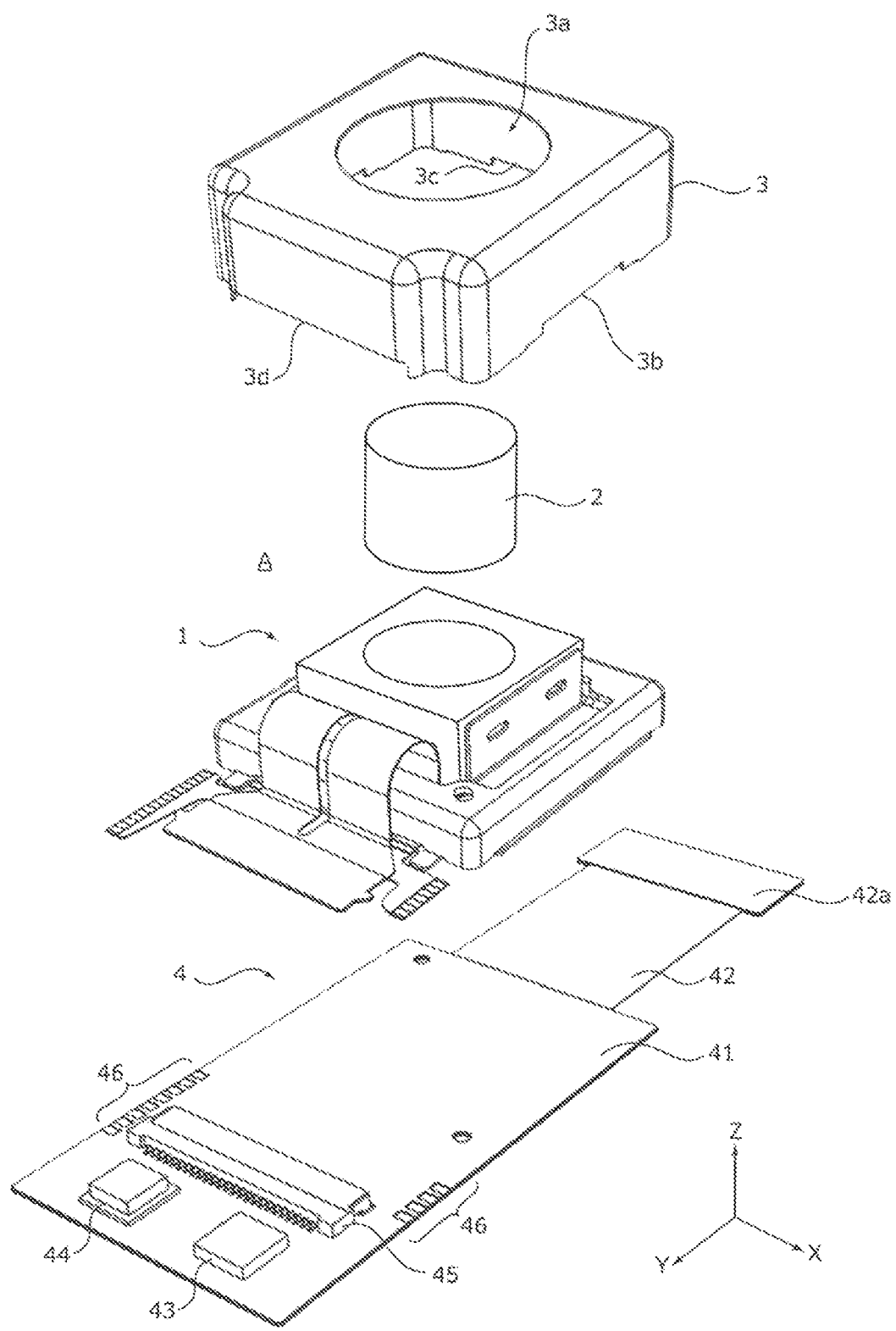
FIG. 3 is an exploded perspective view of the camera module.

FIG. 2 is a perspective view of an external appearance of camera module A. FIG. 3 is an exploded perspective view of camera module A. In the present embodiment, description will be made using an orthogonal coordinate system (X, Y, Z) as illustrated in FIGS. 2 and 3. The drawings below share the same orthogonal coordinate system (X, Y, Z). Camera module A is mounted so that the X direction is its vertical direction (or horizontal direction), the Y direction is its horizontal direction (or vertical direction), and the Z direction is its front-rear direction during the actual capturing of an image with smartphone M. That is, the Z direction is the optical axis direction, the upper side in the drawings is the light reception side in the optical axis direction (also referred to as "macro position side"), and the lower side is the image formation side in the optical axis direction (also referred to as "infinity position side"). In addition, the X and Y directions orthogonal to the Z-axis are referred to as "optical axis-orthogonal directions."

As illustrated in FIGS. 2 and 3, camera module A includes, for example, lens driving device 1 capable of performing AF function and a shake-correcting function, lens part 2 composed of a cylindrical lens barrel and a lens housed therein, cover 3 capable of entire covering, and rigid flexible printed wiring board 4 (hereinafter referred to as "rigid FPC" (FPC: Flexible Printed Circuit)).

In the present embodiment, lens driving device 1 and rigid FPC 4 are different parts; however, lens driving device 1 may include rigid FPC 4 as a component thereof.

Cover 3 is a capped rectangular cylindrical member having a square shape in plan view in the optical axis direction, and has circular opening 3a on the top surface. Lens part 2 faces outside from opening 3a. Cover 3 includes notches 3b and 3c at the bottoms of two side surfaces along the Y direction and at the bottom of one side surface along the X direction, respectively, for positioning cover 3 relative to lens driving device 1 (base 21 of angular shake-correcting fixing part 200, refer to FIG. 7). Cover 3 also includes drawing port 3d at the bottom of the other side surface along the X direction for drawing outside printed wiring board for an image capturing module (herein also referred to as "image capturing module-printed wiring board") 400 (refer to FIG. 5). Cover 3 is fixed to rigid portion 41 of rigid FPC 4.

Rigid FPC 4 includes rigid part 41 formed of a hard material, such as a glass epoxy resin, and flexible part 42 formed of a flexible material, such as a polyimide. Rigid FPC 4 has, for example, a configuration in which rigid part 41 adheres to flexible part 42. In rigid FPC 4, parts are mounted on rigid part 41 having higher rigidity, thereby enabling the mounting of the parts to become easier, and bending of flexible part 42 enables a three-dimensional disposition with higher freedom.

Flexible part 42 includes connector 42a to be connected to the main body side of camera module A. Rigid part 41 and flexible part 42 include a wiring pattern having signal lines and power source lines (not illustrated). Rigid part 41 has, for example, lens driving device 1, driver IC 43, shake detection part 44 and connector 45 mounted thereon. Terminal pads 46 of the wiring pattern (not illustrated) are disposed on the surface of rigid part 41. Performed via rigid FPC 4 are supplying of electricity from the main body side of camera module A to lens driving device 1, driver IC 43 and shake detection part 44, and transmitting/receiving of signals between the main body side of camera module A and lens driving device 1, driver IC 43 and shake detection part 44.

Driver IC 43 controls, in lens driving device 1, operation of the angular shake-correcting driving part, the translational shake-correcting driving part and the driving part for auto-focus in accordance with the instruction from a control part (not illustrated) mounted on smartphone M. The control part may be mounted on rigid part 41, or driver IC 43 may also act as the control part.

Shake detection part 44 detects a shake (motion) of camera module A. Shake detection part 44 includes, for example, a gyro sensor for detecting the angular velocity of camera module A, and an acceleration sensor for detecting acceleration in the X and Y directions. The angular shake of camera module A is detected based on the output of the gyro sensor, and the translational shake of camera module A is detected based on the output of the acceleration sensor.

A detection signal from shake detection part 44 is output to the control part (not illustrated) via the signal line (not illustrated) of rigid part 41 and flexible part 42. The control part controls the current for coil part for angular shake correction (hereinafter also referred to as "angular shake-correcting coil part") 23 (refer to FIG. 7) and coil part for translational shake correction (hereinafter also referred to as "translational shake-correcting coil part") 231 (refer to FIG. 11) via driver IC43 in such a way that the angular shake or translational shake corresponding to the detection signal of shake detection part 44 is canceled out.

Figure 4:
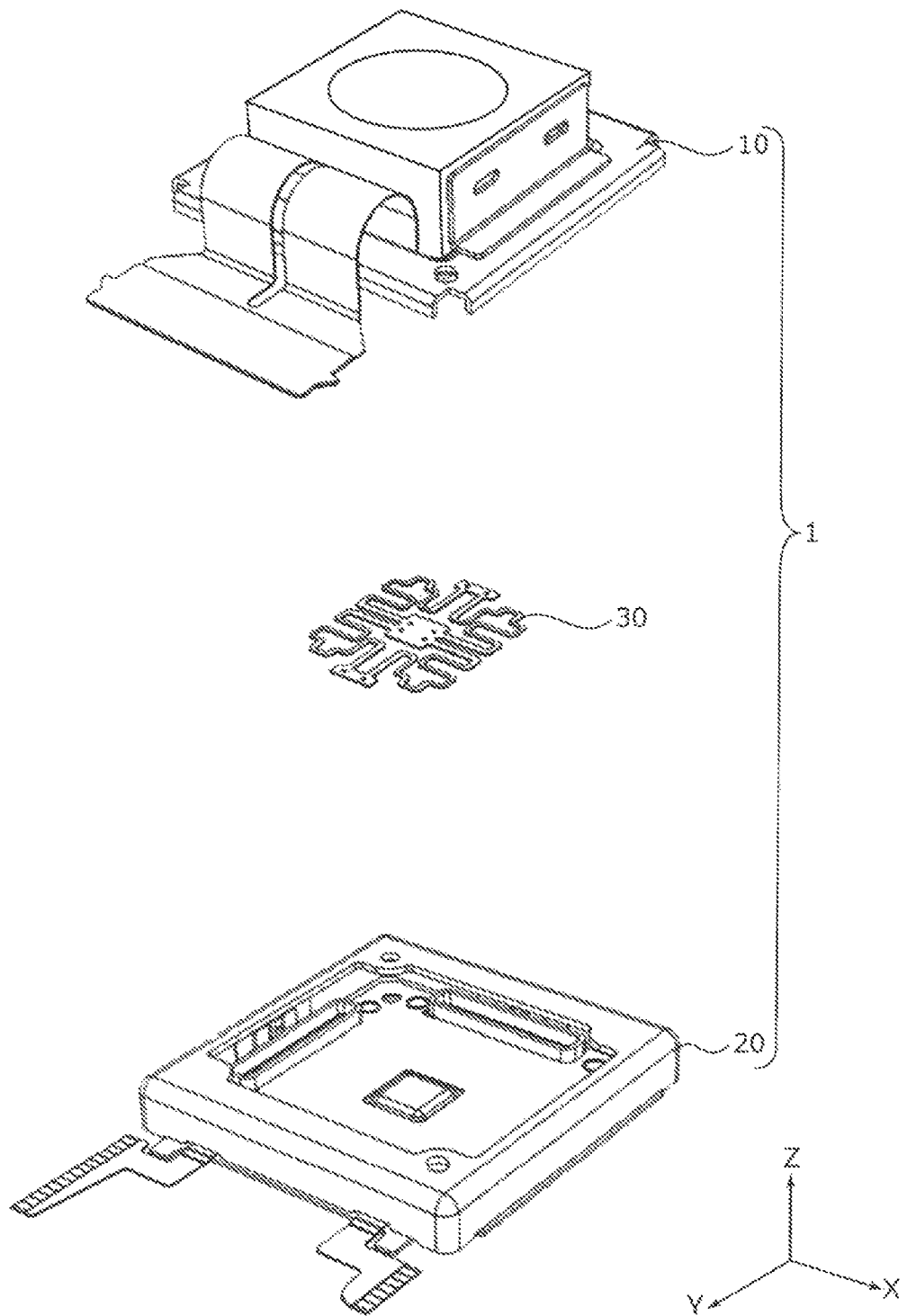
FIG. 4 is an exploded perspective view of an angular shake-correcting driving part.

FIG. 4 is an exploded perspective view of lens driving device 1. As illustrated in FIG. 4, lens driving device 1 includes, for example, angular shake-correcting movable part 10, angular shake-correcting fixing part 200 and angular shake-correcting supporting part 30, as the angular shake-correcting driving part.

Angular shake-correcting movable part 10 is disposed separately from angular shake-correcting fixing part 20 toward the light reception side in the optical axis direction, and coupled with angular shake-correcting fixing part 20 via angular shake-correcting supporting part 30. Angular shake-correcting movable part 10 includes a magnet part for angular shake correction (hereinafter also referred to as an "angular shake-correcting magnet part") constituting a voice coil motor for angular shake correction (hereinafter also referred to as an "angular shake-correcting voice coil motor"), and rotationally sways about X- and Y-axes during the angular shake correction. Angular shake-correcting fixing part 20 includes angular shake-correcting coil part 23 constituting the angular shake-correcting voice coil motor, and supports angular shake-correcting movable part 10 via angular shake-correcting supporting part 30. That is, a moving magnet method is employed for the angular shake-correcting driving part. Angular shake-correcting movable part 10 includes a translational shake-correcting driving part.

Figure 5:
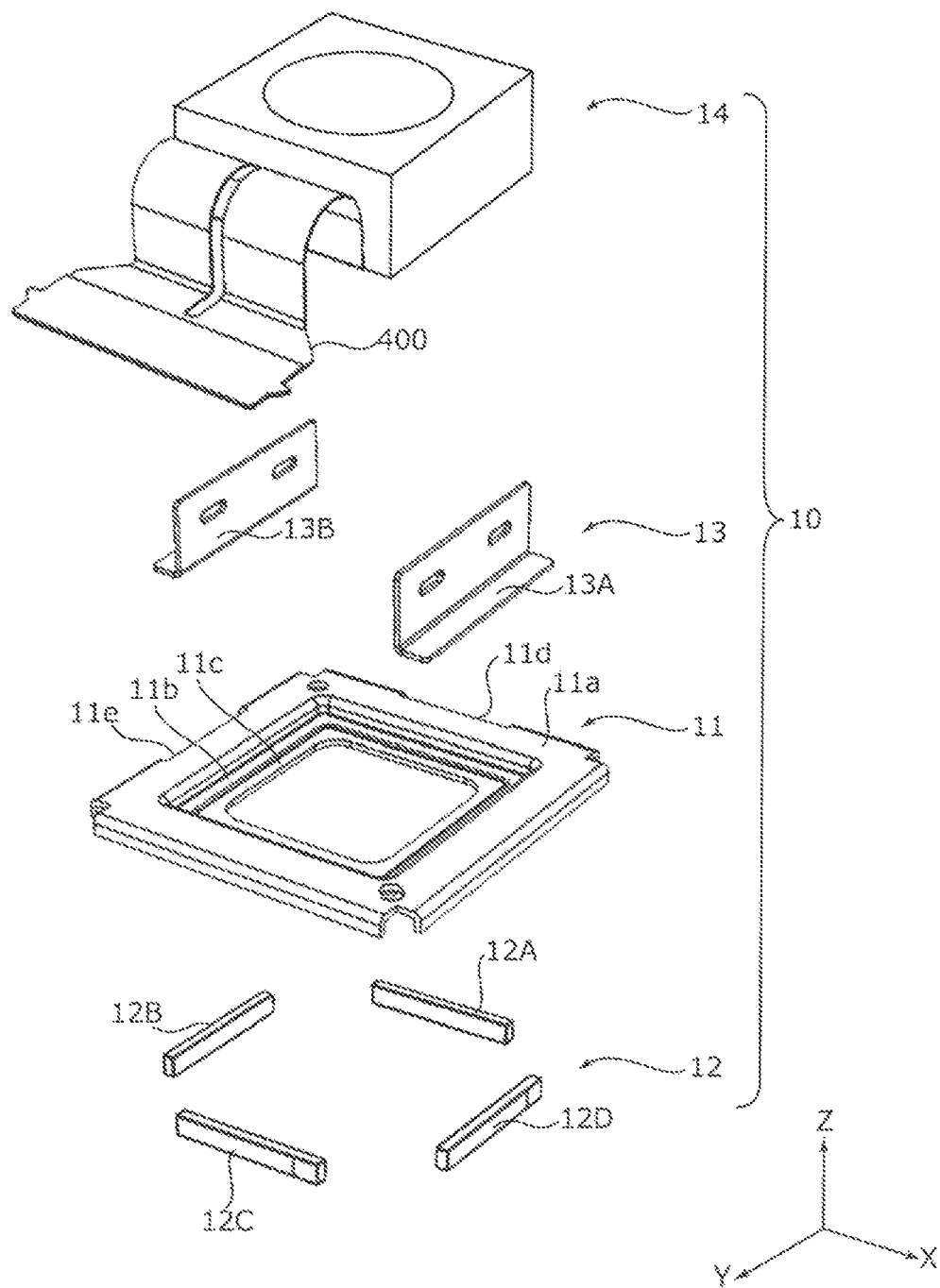
FIG. 5 is an exploded perspective view of an angular shake-correcting movable part.

FIG. 5 is an exploded perspective view of an angular shake-correcting movable part 10. As illustrated in FIG. 5, angular shake-correcting movable part 10 includes yoke 11, angular shake-correcting magnet part 12, module guide part 13, and image capturing module 14.

Yoke 11 is a rectangular frame-shaped member formed of a magnetic material, and holds angular shake-correcting magnet part 12. Yoke 11 includes yoke main body 11*a*, holding frame part 11*b* and gimbal attaching part 11*c*.

The cross-sectional shape of each side part of yoke main body 11*a* is the shape of a recess opening toward angular shake-correcting fixing part 20. That is, yoke main body 11*a* includes a frame-shaped recess (reference sign thereof omitted), and angular shake-correcting magnet part 12 is housed and fixed in the recess.

Yoke main body 11*a* includes notches 11*d* and 11*e* at one peripheral edge along the X direction and one peripheral edge along the Y direction, respectively. Angle detection parts 25 (refer to FIG. 7) are disposed outside notches 11*d* and 11*e*, respectively. The formation of notches 11*d* and 11*e* in yoke main body 11*a* enables magnetic leakage flux from permanent magnets 12A and 12B to effectively cut across angle detection parts 25. Accordingly, angle detection parts 25 can detect tilt of angular shake-correcting movable part 10 relative to the X- or Y-axis based on the change in the magnetic leakage flux from permanent magnets 12A and 12B.

Holding frame part 11*b* is formed from the inner edge of yoke main body 11*a* so as to protrude radially inside. On holding frame part 11*b*, image capturing module 14 is fixed with a double-sided tape, resin adhesive, or the like.

Gimbal attaching part 11*c*, which is disposed one step lower than holding frame part 11*b*, is formed from the inner edge of holding frame part 11*b* so as to protrude radially inside. Angular shake-correcting supporting part 30 (refer to FIG. 6) is attached on the underside of gimbal attaching part 11*c*.

With angular shake-correcting supporting part 30 in the present embodiment, image capturing module 14 approaches one of gimbal axes 30*x* (refer to FIG. 6) of angular shake-correcting supporting part 30 along X-axis when angular shake-correcting movable part 10 rotationally sways about Y-axis. The movable range of angular shake-correcting movable part 10 is thus restricted by the distance between image capturing module 14 and angular shake-correcting supporting part 30. In the present embodiment, gimbal attaching part 11*c* of yoke 11 is formed one step lower than holding frame part 11*b*, and thus the clearance between image capturing module 14 and angular shake-correcting supporting part 30 becomes longer by the step. Therefore, the movable range of angular shake-correcting movable part 10 becomes large compared to when image capturing module 14 is fixed to gimbal attaching part 11*c*.

Angular shake-correcting magnet part 12 is composed of four cuboidal permanent magnets 12A to 12D. Permanent magnets 12A to 12D are in size so as to be housed inside below-described tilt coils 23A to 23D, respectively. Permanent magnets 12A to 12D are each disposed and fixed substantially at the center of the recess of yoke main body 11*a* in the shorter direction and along the longer direction using, for example, an adhesive. The magnetization direction of permanent magnets 12A to 12D is in the Z direction.

When angular shake-correcting movable part 10 is attached to angular shake-correcting fixing part 20, permanent magnets 12A to 12D are positioned inside tilt coils 23A to 23D (refer to FIG. 7), respectively. Regarding each of tilt coils 23A to 23D, one longer side thereof is positioned in the space between an inner leg (inner side surface forming the recess, reference sign thereof is omitted) of yoke main body 11*a*, and the inner surface of each of permanent magnets 12A to 12D; and the other longer side thereof is positioned in the space between an outer leg (outer side surface forming the recess, reference sign thereof is omitted) of yoke main body 11*a*, and the outer surface of each of permanent magnets 12A to 12D. Therefore, opposite magnetic fields are formed at the two longer sides in each of tilt coils 23A to 23D.

The magnetic circuit including angular shake-correcting magnet part 12 and angular shake-correcting coil part 23 is thus positioned beside (but not under) image capturing module 14. This can reduce the height of camera module A.

Module guide part 13 is composed of a pair of module guide parts 13A and 13B whose cross section is L-shaped, and which are formed by sheet-metal processing. Guide members 13A and 13B are fixed to yoke main body 11*a* so that erected walls of the members face each other in the X direction. Module guide part 13 is a guide for fixing of image capturing module 14 to yoke 11. Each of guide members 13A and 13B is fixed to a side surface of image capturing module 14 with an adhesive or the like. This enables accurate attachment of image capturing module 14 to yoke 11, thereby improving the reliability. Module guide part 13 along with image capturing module 14 protrudes upward through reception port 24a of below-described skirt 24.

Figure 6:
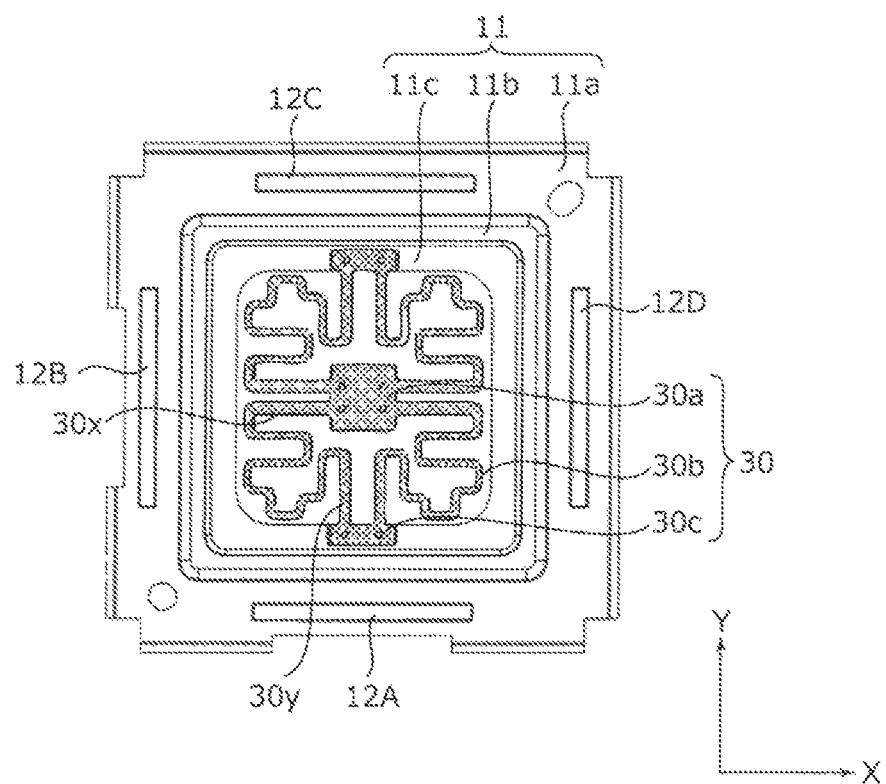
FIG. 6 is a bottom view of a supporting part for angular shake correction (hereinafter also referred to as an "angular shake-correcting supporting part")

FIG. 6 is a bottom view of angular shake-correcting supporting part 30. FIG. 6 illustrates angular shake-correcting supporting part 30 in a state of being attached to angular shake-correcting movable part 10. Angular shake-correcting supporting part 30 is a rectangular member having a biaxial gimbal mechanism (referred to as a gimbal spring).

As illustrated in FIG. 6, angular shake-correcting supporting part 30 includes square central part 30a, inner gimbal 30b and outer gimbals 30c. Inner gimbal 30b has a complex curved shape, and connected to gimbal shafts 30x which extend in a pair from each side of central part 30a along the X-axis. Each outer gimbal 30c is connected to a pair of gimbal shafts 30y which extends from each side of inner gimbal 30b along the Y-axis.

Figure 7:
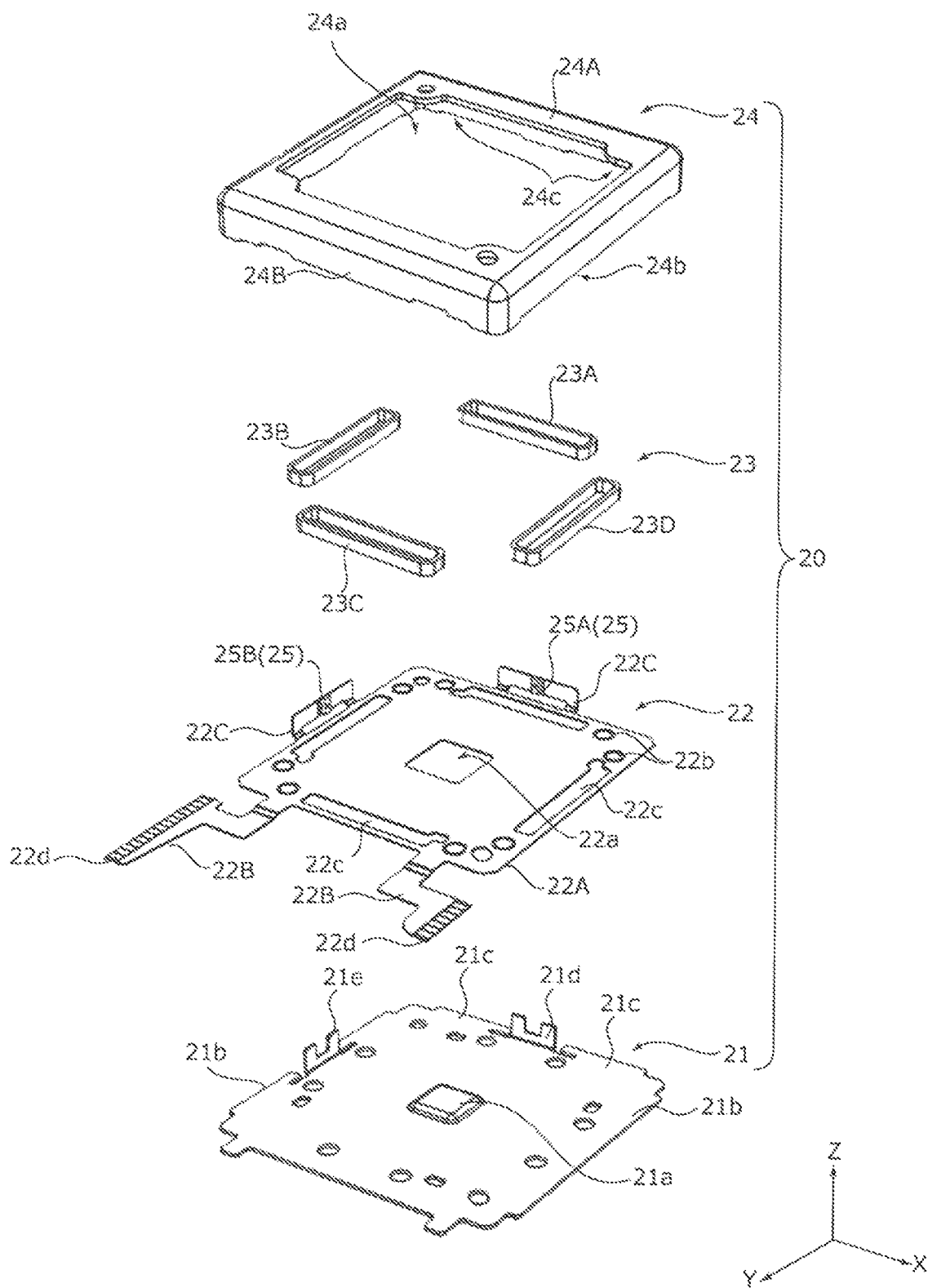
FIG. 7 is an exploded perspective view of an angular shake-correcting fixing part.

Central part 30a of angular shake-correcting supporting part 30 is fixed to protrusion 21a of base 21 (refer to FIG. 7). Outer gimbals 30c are fixed to gimbal attaching part 11c of yoke 11. Angular shake-correcting movable part 10 is thus disposed substantially at the center of base 21 in a suspended state, and can rotationally sway about gimbal shafts 30x and 30y.

FIG. 7 is an exploded perspective view of angular shake-correcting fixing part 20. Angular shake-correcting fixing part 20 is fixed to rigid FPC 4 so that angular shake-correcting fixing part 20 and rigid FPC 4 are both incapable of moving when mounted on smartphone M (refer to FIG. 3). As illustrated in FIG. 7, angular shake-correcting fixing part 20 includes base 21, coil board for angular shake correction (hereinafter also referred to as an "angular shake-correcting coil board") 22, angular shake-correcting coil part 23, skirt 24 and angle detection parts 25.

Base 21 is a substantially rectangular member made of a metallic material. Base 21 being made of a metallic material increases the strength thereof as compared to being made of a resin, thereby reducing the thickness of base 21 and the height of camera module A as a consequence.

Base 21 includes truncated pyramid-shaped protrusion 21a in the center thereof for fixing of angular shake-correcting supporting part 30. Base 21 also includes at peripheral edges thereof protruding side parts 21b and 21c for positioning when fixing cover 3 and skirt 24. Protruding side parts 21b and 21c are respectively engaged with notches 3b and 3c of cover 3, and notches 24b and 24c of skirt 24, when cover 3 and skirt 24 are attached.

Base 21 includes erected pieces 21d and 21e at peripheral edges thereof along X and Y directions, respectively. Erected pieces 21d and 21e each include a U-shaped notch (reference sign thereof omitted). The positioning in the Z direction of angle detection part 25 can be made by bringing the same in contact with the bottom side of the notch.

Angular shake-correcting coil part 23 is composed of four tilt coils 23A to 23D. Angular shake-correcting coil part 23 is disposed on coil disposition parts 22c of angular shake-correcting coil board 22 in such a way that the coil axis of the coil part coincides with the Z direction. Tilt coils 23A and 23C face each other in the Y direction, and are used when rotationally swaying angular shake-correcting movable part 10 about the X-axis. Tilt coils 23B and 23D face each other in the X direction, and are used when rotationally swaying angular shake-correcting movable part 10 about the Y-axis.

Skirt 24 includes upper frame 24A including reception port 24a, and side wall 24B hung from the periphery of upper frame 24A. Side wall 24B includes at the bottom thereof notches 24b and 24c corresponding to protruding side parts 21b and 21c of base 21. Skirt 24 is fixed by being fit outside the outer peripheral edge of base 21 after angular shake-correcting movable part 10 is attached to base 21 via angular shake-correcting supporting part 30. Angular shake-correcting movable part 10 is thus disposed between base 21 and skirt 24.

Angular shake-correcting coil board 22 is composed of a flexible printed circuit, and includes rectangular main board part 22A, terminals 22B extending laterally outward from main board part 22A, and Hall element holding parts 22C extending upward from main board part 22A. Angular shake-correcting coil board 22 includes a wiring pattern (not illustrated) having power source lines of angular shake-correcting coil part 23 and angle detection part 25, and a signal line of angle detection part 25. Main board part 22A of angular shake-correcting coil board 22 is disposed on base 21.

Main board part 22A includes in the central part thereof opening 22a for inserting protrusion 21a of base 21 thereto. Protrusion 21a protrudes upward through opening 22a of angular shake-correcting coil board 22. Main board part 22A includes, along four peripheral edges thereof, coil disposition parts 22c, which are formed one step lower than periphery thereof. Main board part 22A also includes, at both ends of each coil disposition part 22c, power supply pads 22b which are connected to power source lines of the wiring pattern (not illustrated). Power supply pads 22b are electrically connected with angular shake-correcting coil part 23 (tilt coils 23A to 23D) disposed on coil disposition part 22c by, for example, soldering.

Terminals 22B include total 12 pins of connecting terminals 22d composed of two pins connected to a power source line shared by tilt coils 23B and 23D facing each other in the X direction, two pins connected to a power source line shared by tilt coils 23A and 23C facing each other in the Y direction, and 8 pins connected to power source lines and signal lines for Hall elements 25A and 25B. The number of the connecting terminals 22d may be any other number which corresponds to the number of input/output terminals of parts used in the translational shake-correcting driving part.

Connecting terminals 22d are electrically connected to terminal pads 46 of rigid FPC 4 when mounting lens driving device 1 on rigid FPC 4. Further, connecting terminals 22d are connected to an inspection and evaluation device for checking operation of lens driving device 1 alone.

Hall element holding parts 22C are formed at the positions corresponding to those of erected pieces 21d and 21e of base 21. On Hall element holding parts 22C, Hall elements 25A and 25B constituting angle detection part 25 are respectively disposed. Each of Hall element holding parts 22C includes a cutout window (reference sign thereof omitted) at the connecting region with main board part 22A. Erected pieces 21d and 21e of base 21 are each inserted into the cutout window (reference sign thereof omitted), thereby positioning each of Hall elements 25A and 25B disposed on Hall element holding part 22C.

Angle detection part 25 senses rotational swaying of angular shake-correcting movable part 10, i.e., the orientation of image capturing module 14, thereby detecting the tilt relative to X- and Y-axes. Angle detection part 25 is composed of, for example, two Hall elements 25A and 25B. Hall elements 25A and 25B are mounted on Hall element holding part 22C of angular shake-correcting coil boards 22 so that the Hall elements are respectively disposed to be separated from and facing to two (permanent magnets 12A and 12B)

of four permanent magnets 12A to 12D constituting angular shake-correcting magnet part 12.

Hall elements 25A and 25B are, for example, disposed so that magnetic leakage flux from permanent magnets 12A and 12B cut across in the Z direction. In the present embodiment, Hall elements 25A and 25B are mounted parallel to and on the outside of tilt coils 23A and 23B, which are disposed in main board part 22A, so as to face permanent magnets 12A and 12B disposed in tilt coils 23A and 23B, respectively.

A detection signal from angle detection part 25 is output to a control part (not illustrated) via the signal line (not illustrated) of rigid FPC 4. During the correction of an angular shake corresponding to the detection signal of shake detection part 44, the control part controls the current for angular shake-correcting coil part 23 based on the detection signal from angle detection part 25 so that angular shake-correcting movable part 10 returns to the reference position (referred to as feedback control).

Angle detection part 25 may be mounted on rigid FPC 4 instead of on lens driving device 1.

In angular shake-correcting coil board 22, terminals 22B including connecting terminals 22d extend laterally outward from main board part 22A, and thus protrude outside skirt 24 when assembling lens driving device 1. This enables easy check for operation of lens driving device 1 using the inspection and evaluation device which is connected to connecting terminals 22d of angular shake-correcting coil board 22 before the mounting of lens driving device 1 on rigid FPC 4.

Of all lens driving devices 1 evaluated before mounting, only the one which is determined as qualified is mounted on rigid FPC 4, and therefore, rigid FPC 4 which is expensive itself and further includes expensive parts, such as shake detection part 44 and driver IC43, can be prevented from being found unusable due to the malfunction of the lens driving device. Accordingly, it is possible to produce highly reliable camera module A with its production cost reduced.

Figure 8:
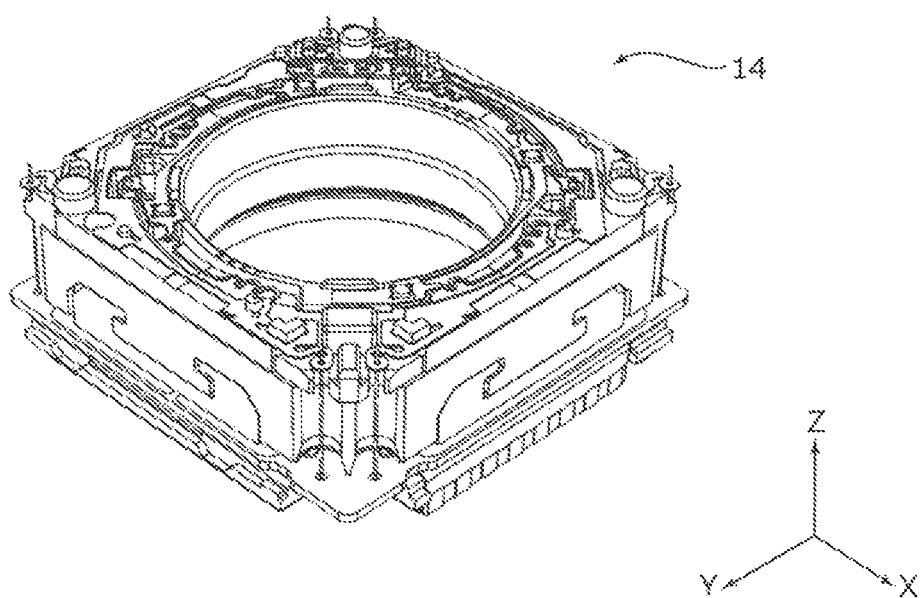
FIG. 8 is a perspective view of an external appearance of an image capturing module.
Figure 9:
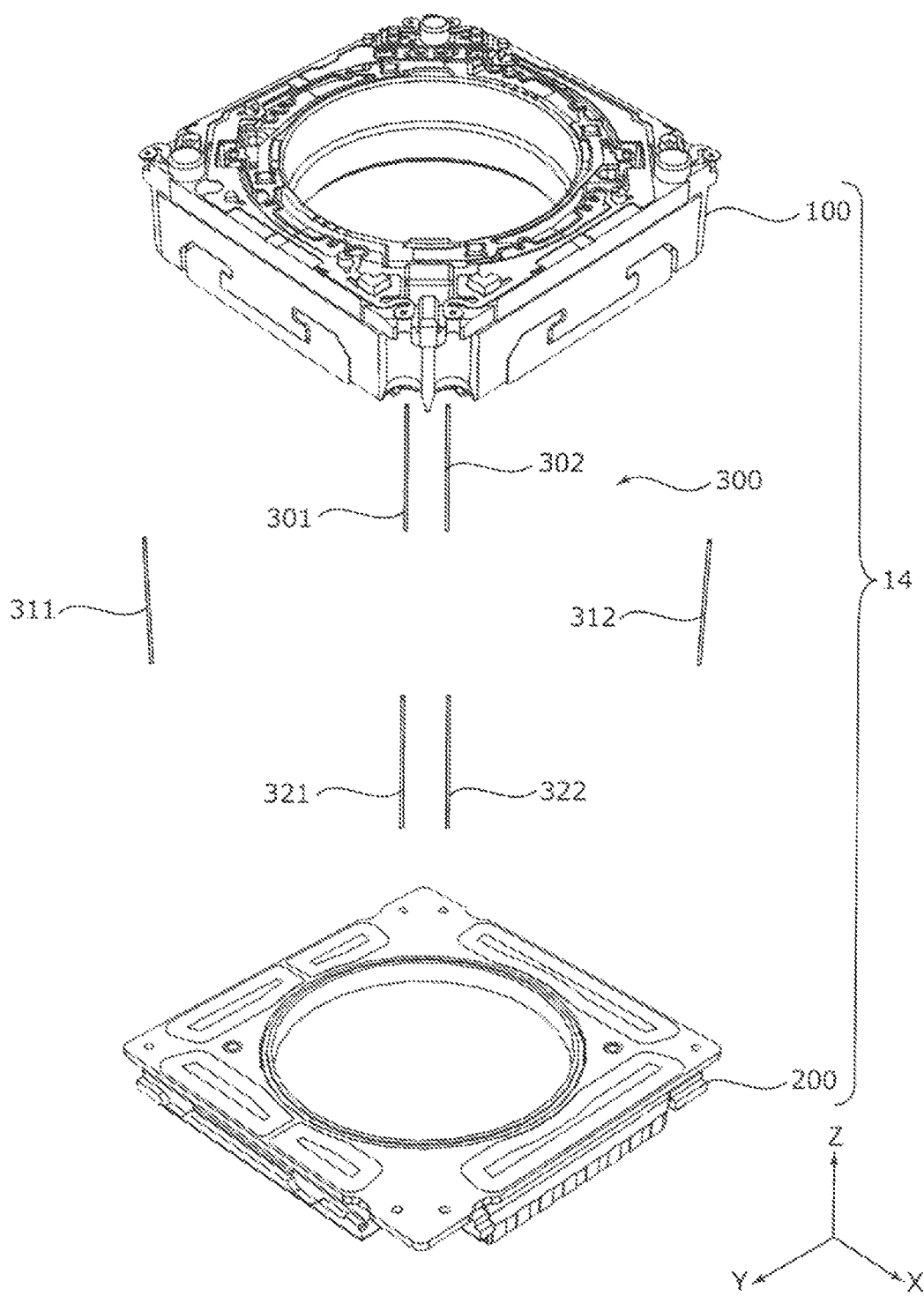
FIG. 9 is an exploded perspective view of the image capturing module.

FIG. 8 is a perspective view of an external appearance of image capturing module 14. FIG. 9 is an exploded perspective view of image capturing module 14. In FIGS. 8 and 9, image capturing module-printed wiring board 400 (refer to FIG. 5) is omitted. Image capturing module 14 includes a translational shake-correcting driving part and an AF driving part.

As illustrated in FIGS. 8 and 9, image capturing module 14 includes as the translational shake-correcting driving part, for example, translational shake-correcting movable part 100, translational shake-correcting fixing part 200, supporting part for translational shake correction (hereinafter also referred to as a "translational shake-correcting supporting part") 300, image capturing module-printed wiring board 400 (refer to FIG. 5), and an image capturing part (not illustrated).

Translational shake-correcting movable part 100 is disposed separately from translational shake-correcting fixing part 200 toward the light reception side in the optical axis direction, and coupled with translational shake-correcting fixing part 200 via translational shake-correcting supporting part 300. Translational shake-correcting movable part 100 includes a magnet part for translational shake correction (magnet part 122) (hereinafter also referred to as a "translational shake-correcting magnet part") constituting a voice coil motor for translational shake correction (hereinafter also referred to as a "translational shake-correcting voice coil motor"), Translational shake-correcting movable part 100 makes translational movement in the X or Y direction during the translational shake correction. Translational shake-correcting fixing part 200 includes translational shake-correcting coil part 231 constituting the translational shake-correcting voice coil motor, and supports translational shake-correcting movable part 100 via translational shake-correcting supporting part 300. That is, a moving magnet method is employed for the translational shake-correcting driving part. Translational shake-correcting movable part 100 includes the AF driving part (AF movable part 110 and AF fixing part 120 (refer to FIG. 10)).

In the present embodiment, translational shake-correcting supporting part 300 is composed of six suspension wires extending in the Z direction (hereinafter referred to as "suspension wires 300"). One end (top end) of suspension wire 300 is fixed to translational shake-correcting movable part 100 (upper elastic supporting part 130; refer to FIG. 10), and the other end (bottom end) is fixed to translational shake-correcting fixing part 200 (coil board for translational shake correction (hereinafter also referred to as a "translational shake-correcting coil board") 230; refer to FIG. 11). Translational shake-correcting movable part 100 is supported by suspension wires 300 so as to be capable of swaying in an XY plane.

Of six suspension wires 600, suspension wires 301 and 302 are used as signal lines for Hall element 161 (refer to FIG. 10) (suspension wire for signal). Suspension wires 311 and 312 are used as power source lines for Hall element 161 (suspension wire for power supplying to Hall element). Suspension wires 321 and 322 are used as power source lines for AF coil part 112 (refer to FIG. 10) (suspension wire for power supplying to coil). The number of suspension wires 300 may be more than six.

An image capturing part (not illustrated) includes an imaging device (not illustrated), and is disposed on translational shake-correcting fixing part 200 on the image formation side in the optical axis direction. The imaging device (not illustrated) is composed of, for example, a CCD (charge coupled device) image sensor, or a CMOS (complementary metal oxide semiconductor) image sensor. An IR filter (not illustrated) is disposed on the imaging device (not illustrated) on the light reception side in the optical axis direction. The imaging device (not illustrated) captures a subject image which is imaged using lens part 2. The image capturing part is mounted on image capturing module-printed wiring board 400.

In the present embodiment, image capturing module-printed wiring board 400 is composed of flexible printed circuits having flexibility. Image capturing module-printed wiring board 400 includes a wiring pattern (not illustrated) having power source lines of translational shake-correcting coil part 231 and AF coil part 112, a signal line for video signals output from the imaging device (not illustrated), a power source line and signal line of Z-position detection part 160, and a power source line and signal line of XY-position detection part 240. As image capturing module-printed wiring board 400 is flexible, it does not prevent rotational swaying of angular shake-correcting movable part 10 when disposed on angular shake-correcting movable part 10.

When assembling lens driving device 1, image capturing module-printed wiring board 400 is pulled out to the outside through drawing port 3d of cover 3 from the inside of cover 3 and over skirt 24 (refer to FIGS. 2 and 3) The pulled out-image capturing module-printed wiring board 400 is connected to connector 45 of rigid FPC 4.

Figure 10:
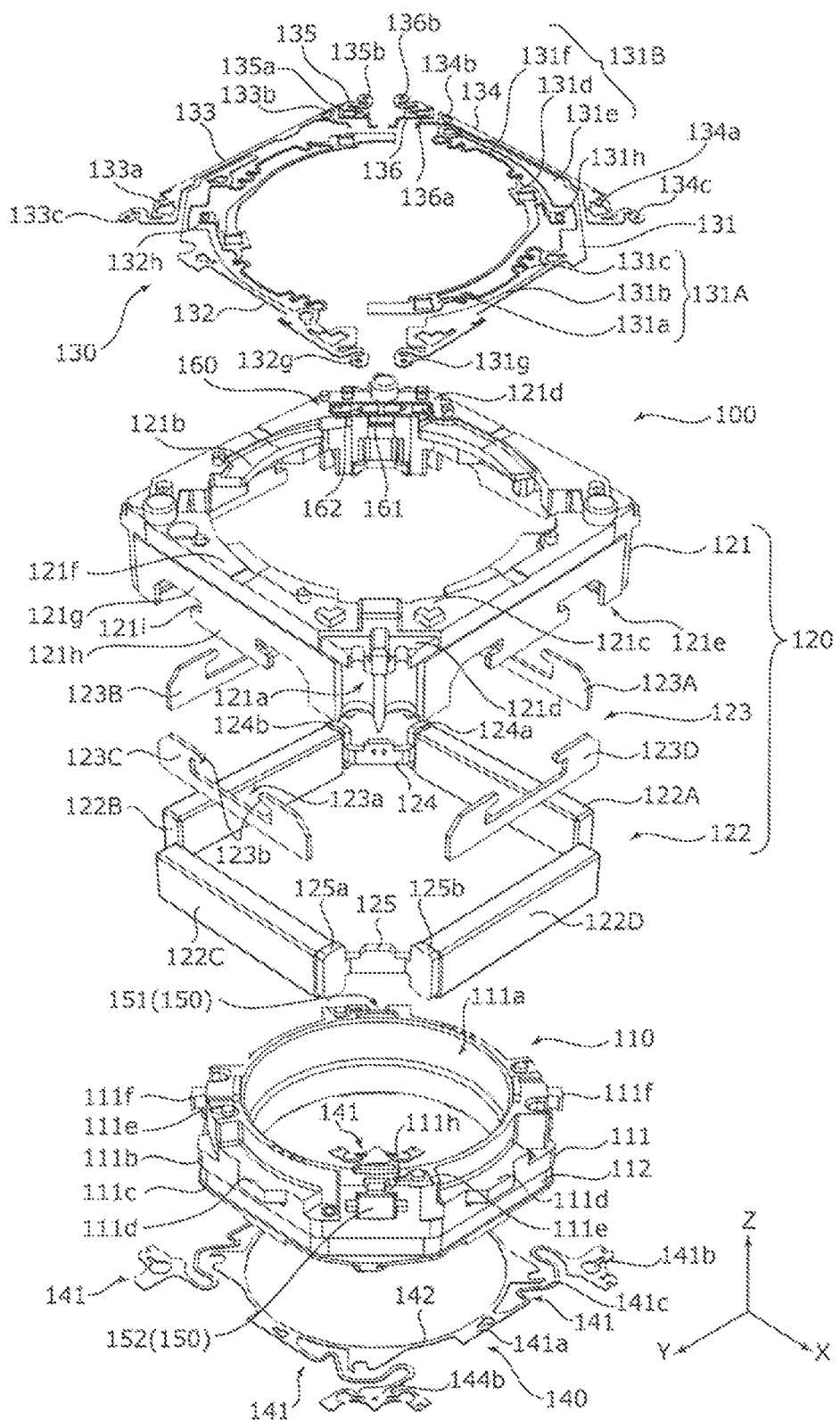
FIG. 10 is an exploded perspective view of a translational shake-correcting movable part.

FIG. 10 is an exploded perspective view of translational shake-correcting movable part 100. As illustrated in FIG. 10, translational shake-correcting movable part 100 includes, for example, AF movable part 110, AF fixing part 120, upper elastic supporting part 130 and lower elastic supporting part 140.

AF movable part 110 is disposed separately from and radially inside AF fixing part 120, and coupled with AF fixing part 120 by upper elastic supporting part 130 and lower elastic supporting part 140. AF movable part 110 includes AF coil part 112 constituting a voice coil motor for AF, and moves in the optical axis direction during the focusing. AF fixing part 120 includes AF magnet part (magnet part 122) and supports AF movable part 110 via upper elastic supporting part 130 and lower elastic supporting part 140. That is, a moving coil method is employed for the AF driving part.

AF movable part 110 includes lens holder 111, AF coil part 112 and detection magnet 150.

Lens holder 111 is a cylindrical member, and lens part 2 (refer to FIG. 3) is fixed to lens housing part 111*a* by adhesion or screwing. Lens holder 111 includes upper flange 111*b* and lower flange 111*c* on the circumferential surface of lens housing part 111*a*. AF coil part 112 is wound in a part between upper flange 111*b* and lower flange 111*c* (hereinafter referred to as "coil winding part").

Lens holder 111 includes upper spring fixing parts 111*e*, for fixing upper elastic supporting part 130, at four parts in the upper-side of the outer periphery of lens housing part 111*a* where directions rotated by 45° (hereinafter referred to as "diagonal directions") from the X and Y directions (hereinafter referred to as "cross directions") intersect the outer periphery. Lens holder 111 includes tying parts 111*f* which protrude radially outside from two diagonally-opposite upper spring fixing parts 111*e* of four upper spring fixing parts 111*e*. Lens holder 111 also includes, on the underside thereof, lower spring fixing parts (reference sign thereof omitted) for fixing lower elastic supporting part 140 at four parts where the cross directions intersect the outer periphery.

Lens holder 111 includes protrusions 111*d* which protrude radially outside compared to upper flange 111*b* and lower flange 111*c* at four parts in the upper-side of the outer periphery of lens housing part 111*a* where the cross directions intersect the outer periphery. The top surfaces of protrusions 111*d* serve as locking parts for restricting the movement of AF movable part 110 toward the light reception side in the optical axis direction, and the bottom surfaces of protrusions 111*d* serve as locking parts for restricting the movement of AF movable part 110 toward the image formation side in the optical axis direction.

AF coil part 112 is an air-core coil energized during the focusing, and is wound around the outer peripheral surface of the coil winding part of lens holder 111. The both ends of AF coil part 112 are tied to tying parts 111*f* of lens holder 111.

Position detection magnet 150 is disposed in magnet housing part 111*h* formed on upper spring fixing part 111*e* of lens holder 111. Position detection magnet 150 disposed on the side corresponding to Z-position detection part 160 (hereinafter referred to as "first position detection magnet 151") is actually used for position detection of AF movable part 110. The other position detection magnet 150 (hereinafter referred to as "second position detection magnet 152") is a dummy magnet that is not used for the position detection of AF movable part 11. Second position detection magnet 152 is disposed for balancing a magnetic force which acts on AF movable part 110, and for stabilizing the orientation of AF movable part 110. When second position detection magnet 152 is not disposed, a one-sided magnetic force is exerted on AF movable part 110 due to the magnetic field generated by magnet part 122, and the orientation of AF movable part 110 becomes unstable. This can be prevented from occurring by disposing second position detection magnet 152.

AF fixing part 120 includes magnet holder 121, magnet part 122, and Z-position detection part 160. Magnet part 122 is attached after AF movable part 110 is inserted into magnet holder 121.

Magnet holder 121 includes square upper frame 121*f* and side walls 121*g* hung from upper frame 121*f*. Magnet holder 121 is in a square cylindrical shape as a whole. Magnet holder 121 is formed of a nonmagnetic material in the present embodiment, and holds magnet part 122 attached on the inner surfaces of side walls 121*g*.

Side wall 121*g* includes protruding to-be-engaged part 121*h* for engaging with engaging part 123*a* of auxiliary yoke parts 123. To-be-engaged part 121*h* includes, at the base of the protrusion thereof, horizontally recessed claw fitting parts 121*i* where claws 123*b* of engaging part 123*a* fit in.

Magnet holders 121 is formed in an arc shape and recessed radially inside at each of four connecting parts (four sides extending along the Z direction) where side walls 121*g* connect. Suspension wire 300 is disposed in this part (hereinafter referred to as "wire insertion part 121*a*"). Providing wire insertion part 121*a* enables avoidance of interference between suspension wire 300 and magnet holder 121 during translational movement of translational shake-correcting movable part 100.

Magnet holder 121 includes, in upper frame 121*f*, ring-shaped stopper part 121*b* protruding radially inside. In stopper part 121*b*, portions corresponding to upper spring fixing parts 111*e* of lens holder 111 are notched so that AF movable part 110 can move toward the light reception side in the optical axis direction compared to the top surface of magnet holder 121. When AF movable part 110 moves toward the light reception side in the optical axis direction, stopper part 121*b* touches protrusion 111*d* of lens holder 111, thereby restricting the movement of AF movable part 110 toward the light reception side in the optical axis direction. In addition, arm parts 131*c*, 131*f*, 132*c* and 132*f* of upper elastic supporting part 130 are placed on the top surface of stopper part 121*b*.

Magnet holder 121 includes, at four corners 121*e* on the underside thereof, lower spring fixing parts (hereinafter referred to as "lower spring fixing parts 121*e*") for fixing lower elastic supporting part 140. Magnet holder 121 includes, at four corners of upper frame 121*f*, upper spring fixing parts 121*c* for fixing upper elastic supporting part 130. The top surface of corner part 121*d* of upper spring fixing part 121*c* is slightly recessed from the top surface (the surface on which upper elastic supporting part 130 is to be attached) of magnet holder 121 so that a gap is formed (hereinafter referred to as "damper installation part 121*d*") when upper elastic supporting part 130 is attached. A vertex part (a portion provided continuously with the upper portion of wire insertion part 121*a*) of damper installation part 121*d* protrudes outward compared to the lower portion, and is notched in an arc shape. The notched portion having an arc shape in damper installation part 121*d* forms a part of wire insertion part 121*a*.

Magnet part 122 includes four cuboidal permanent magnets 122A to 122D and coupling yokes 124 and 125. Permanent magnets 122A to 122D are disposed along the inner surfaces of four side walls 121*g* of magnet holder 121. Permanent magnets 122A to 122D are magnetized so that a magnetic field that cuts across in the radial direction is formed in AF coil part 112. For example, permanent magnets 122A to 122D are magnetized so that the inner periphery side and the outer periphery side thereof are set to N pole and S pole, respectively. Protrusion 111d of lens holder 111 is thus positioned in a space between magnet part 122 and stopper part 121b of magnet holder 121. In the present embodiment, magnet part 122 serves as both an AF magnet part and a translational shake-correcting magnet part.

One of end surfaces of permanent magnet 122A in the longitudinal direction is coupled with an end surface of adjacent permanent magnet 122B in the longitudinal direction via coupling yoke 124. Coupling yoke 124 includes yoke part 124a at one end portion thereof, and yoke part 124b at the other end portion thereof. That is, yoke part 124a is disposed at the end surface of permanent magnet 122A in proximity to first position detection magnet 151, and yoke part 124b is disposed at the end surface of permanent magnet 122B in proximity to first position detection magnet 151.

Similarly, one of end surfaces of permanent magnet 122C in the longitudinal direction is coupled with an end surface of adjacent permanent magnet 122D in the longitudinal direction via coupling yoke 125. Yoke part 125a is disposed at the end surface of permanent magnet 122C in proximity to second position detection magnet 152, and yoke part 125b is disposed at the end surface of permanent magnet 122D in proximity to second position detection magnet 152.

Yoke parts 124a and 124b are used for suppressing intersection of the magnetic flux generated by magnet part 122 and the detection part of Hall element 161, namely for reducing a leakage flux from magnet part 122. Disposing of yoke parts 124a and 124b enables reduction of the output offset of Hall element 161, and setting amplification gain at a high level, thereby improving detection sensitivity. Disposing of yoke parts 124a and 124b generates an attraction force between first position detection magnet 151 and yoke parts 124a and 124b. Yoke parts 125a and 125b are disposed for balancing a magnetic force which acts on AF movable part 110, and for stabilizing the orientation of AF movable part 110.

While coupling yokes 124 and 125 are employed in the present embodiment, yoke parts 124a, 124b, 125a, and 125b each may be composed of an independent member. Yoke parts 124a and 124b are, however, preferably coupled with each other as described in the present embodiment. This enables attaching operation to become remarkably easy compared to the case where an independent yoke part is attached to each of permanent magnets 122A and 122B. In addition, an attraction force is also generated between first position detection magnet 151 and a coupling part that couples yoke part 124a and yoke part 124b, and therefore, when designing coupling yoke 124 to have the attraction force with a desired value, the thickness of yoke parts 124a and 124b can be reduced. Accordingly, the length of permanent magnets 122A and 122B can be increased, and therefore, the driving performance of the AF driving part is improved. Furthermore, the above-mentioned configuration is useful for reinforcing the strength of AF fixing part 120.

Auxiliary yoke part 123 is composed of a magnetic material, and formed of, for example, a plate shaped magnetic material such as SPCC (cold rolled steel plate). Disposing auxiliary yoke part 123 on magnet part 122 increases the magnetic force of magnet part 122, thereby increasing thrust during translational shake correction and automatic focusing.

Auxiliary yoke part 123 includes four plate shaped-auxiliary yokes 123A to 123D respectively corresponding to permanent magnets 122A to 122D. The shape (height, length and thickness) of each of auxiliary yokes 123A to 123D is set in such a way that the magnetic flux is not saturated in each of permanent magnets 122A to 122D which function as magnetic circuits of translational shake-correcting driving part and AF driving part. Auxiliary yokes 123A to 123D are attracted to the outer magnetic pole faces of permanent magnets 122A to 122D, respectively. Auxiliary yokes 123A to 123D may be adhered to respective permanent magnets 122A to 122D.

The undersides of auxiliary yokes 123A to 123D (surfaces facing coils for translational shake correction 231A to 231D) are attached to be flush with the undersides of corresponding permanent magnets 122A to 122D, respectively. The top surfaces of auxiliary yokes 123A to 123D are preferably lower than the top surfaces of corresponding permanent magnets 122A to 122D, respectively.

Each of auxiliary yokes 123A to 123D includes, in the upper portion thereof, engaging part 123a for engaging with to-be-engaged part 121h of side wall 121g of magnet holder 121. Engaging part 123a is formed in a recessed shape corresponding to the shape of protruding to-be-engaged part 121h. The magnetic flux density in the central part of auxiliary yoke part 123 in the longitudinal direction is low, and thus, desired thrust can be obtained in the translational shake-correcting driving part and AF driving part, even when this part is notched. Therefore, forming engaging parts 123a in a recessed shape enables reduction of the weight of auxiliary yoke 123 while the thrust in the shake-correcting driving part and AF driving part is ensured.

Engaging part 123a further includes claws 123b protruding in the directions opposite to each other at upper end portions of side parts which face each other and constitute the recessed part. Fitting of claws 123b in claw fitting parts 121i of magnet holder 121 enables restricting of the movement of auxiliary yoke part 123 relative to magnet holder 121 in the Z direction, thereby enabling accurate positioning of auxiliary yoke part 123 to magnet part 122.

Auxiliary yoke part 123 may be integrally molded with resin-made magnet holder 121 by insert molding. Integrally molding of parts by insert molding can reduce the number of assembling steps, and also enhance position accuracy of auxiliary yoke part 123.

Z-position detection part 160 is disposed on one of four upper spring fixing parts 121c of magnet holder 121. Z-position detection part 160 includes Hall element 161 which detects the change in the magnetic field using Hall effect, and board for position detection (hereinafter also referred to as "position detection board") 162 for power supplying to Hall element 161 and for extracting a detection signal.

Hall element 161 includes a detection part (not illustrated) composed of a semiconductor element, and is disposed in such a way that the detection direction of the detection part coincides with the optical axis direction. Z-position detection part 160 mainly detects the change in the magnetic field from first position detection magnet 151. This enables detection of the position of AF movable part 110 in the optical axis direction.

Upper elastic supporting part 130 is, for example, a leaf spring formed of beryllium copper, nickel copper, stainless-steel or the like, and is in a square shape as a whole in plan view. Upper elastic supporting part 130 includes upper leaf springs 131 and 132 elastically supporting AF movable part 110 relative to AF fixing part 120, power-source line parts 133 and 134 for supplying power to Hall element 161, and signal line parts 135 and 136 for extracting a detection signal from Hall element 161. Upper leaf springs 131 and 132, power-source line parts 133 and 134, and signal line parts 135 and 136 are shaped by, for example, etching.

Upper leaf spring 131 includes two spring parts 131A and 131B. Spring part 131A includes lens holder fixing part 131a which is to be fixed to lens holder 111, magnet holder fixing part 131b which is disposed radially outside lens holder fixing part 131a and is to be fixed to magnet holder 121, and arm part 131c which couples lens holder fixing part 131a and magnet holder fixing part 131b. Similarly, spring part 131B includes lens holder fixing part 131d, magnet holder fixing part 131e, and arm part 131f. Lens holder fixing parts 131a and 131d are coupled inside arm part 131c, and magnet holder fixing parts 131b and 131e are coupled outside arm parts 131c and 131f.

Lens holder fixing parts 131a and 131d have a shape corresponding to that of upper spring fixing parts 111e of lens holder 111. The positioning bosses (reference sign thereof omitted) of lens holder 111 are fitted into the fixing holes (reference sign thereof omitted) of lens holder fixing parts 131a and 131d, respectively, thereby positioning and fixing upper leaf spring 131 to lens holder 111.

Magnet holder fixing parts 131b and 131e have a shape corresponding to that of upper spring fixing parts 121c of magnet holder 121. The positioning bosses (reference sign thereof omitted) of upper spring fixing parts 121c are fitted into the fixing holes (reference sign thereof omitted) of magnet holder fixing parts 131b and 131e, respectively, thereby positioning and fixing upper leaf spring 131 to magnet holder 121.

Arm parts 131c and 131f extend in the XY plane in a wave form, and are elastically deformed during the translational movement of AF movable part 110.

Upper leaf spring 131 includes wire connecting part 131g extending in a curved shape from magnet holder fixing part 131b. Suspension wire 322 (refer to FIG. 9) for supplying power to AF coil part 112 is connected to wire connecting part 131g. Upper leaf spring 131 includes coil connecting part 131h which has a U-shape in plan view and extends from lens holder fixing part 131d. Coil connecting part 131h is electrically connected by soldering to one end portion of AF coil part 112 tied to one of tying parts 111f of lens holder 111.

Although the shape of upper leaf spring 132 is not completely identical to that of upper leaf spring 131, their basic structures are similar to each other, and therefore, the description thereof is omitted. Suspension wire 321 (refer to FIG. 9) for supplying power to AF coil part 112 is connected to wire connecting part 132g of upper leaf spring 132. Coil connecting part 132h is electrically connected by soldering to the other end portion of AF coil part 112 tied to the other one of tying parts 111f of lens holder 111.

Power-source line part 133 includes, at the both end portions thereof, fixing holes 133a and 133b corresponding to the positioning bosses (reference sign thereof omitted) of magnet holder 121, respectively. Power-source line part 133 includes, at one end portion thereof (end portion on fixing hole 133a side), wire connecting part 133c extending in a curved shape. Suspension wire 311 (refer to FIG. 9) for supplying power to Hall element 161 is connected to wire connecting part 133c. The other end portion (end portion on fixing hole 133b side) of power-source line part 133 is connected to the power source terminal of position detection board 162.

The shape of power-source line part 134 is symmetrical with that of power-source line part 133. Suspension wire 312 (refer to FIG. 9) for supplying power to Hall element 161 is connected to wire connecting part 134c of power-source line part 134. The other end portion (end portion on fixing hole 134b side) of power-source line part 134 is connected to the power source terminal of position detection board 162.

Signal line part 135 includes fixing hole 135a corresponding to the positioning boss (reference sign thereof omitted) of magnet holder 121. Signal line part 135 includes, at one end portion thereof, wire connecting part 135b extending in a curved shape. To wire connecting part 135b, suspension wire 301 (refer to FIG. 9) for extracting a detection signal from Hall element 161 is connected. The other end portion of signal line part 135 is connected to the signal terminal of position detection board 162.

The shape of signal line part 136 is symmetrical with that of signal line part 135. Suspension wire 302 (refer to FIG. 9) for extracting a detection signal from Hall element 161 is connected to wire connecting part 136b of signal line part 136. The other end portion 136a of signal line part 136 is connected to the signal terminal of position detection board 162.

Wire connecting parts 131g, 132g, 133c, 134c, 135b and 136b are positioned on wire insertion parts 121a of magnet holder 121 on the light reception side in the optical axis direction. In the state where upper elastic supporting part 130 is attached to magnet holder 121, gaps are formed between wire connecting parts 131g, 132g, 133c, 134c, 135b and 136b and damper installation parts 121d, respectively (see FIG. 9). Dampers are disposed in these gaps.

Further, wire connecting parts 131g, 132g, 133c, 134c, 135b and 136b each have a shape which is easily and elastically deformed. Deflection of wire connecting parts 131g, 132g, 133c, 134c, 135b and 136b and suspension wires 300 absorbs drop impact. Accordingly, plastic deformation and rupture of suspension wires 300 due to an impact of dropping or the like can be effectively prevented.

As with upper elastic supporting part 130, lower elastic supporting part 140 (hereinafter referred to as "lower leaf spring 140") is, for example, a leaf spring formed of beryllium copper, nickel copper, stainless-steel or the like and is in a square shape as a whole in plan view. Lower leaf spring 140 elastically connects AF fixing part 120 (magnet holder 121) and AF movable part 110 (lens holder 111). Lower leaf spring 140 is shaped by, for example, etching.

Lower leaf spring 140 includes four spring parts 141. Each spring part 141 includes lens holder fixing part 141a which is to be fixed to lens holder 111, magnet holder fixing part 141b which is disposed at a position rotated by 45° from lens holder fixing part 141a and is to be fixed to magnet holder 121, and arm part 141c which couples lens holder fixing part 141a and magnet holder fixing part 141b.

Adjacent lens holder fixing parts 141a are coupled with each other via coupling part 142, and lens holder fixing parts 141a as a whole have a shape corresponding to that of the lower spring fixing parts (not illustrated) of lens holder 111. The positioning bosses (reference sign thereof omitted) of the lower spring fixing parts of lens holder 111 are fitted into the fixing holes (reference sign thereof omitted) of lens holder fixing parts 141a, thereby positioning and fixing lower leaf spring 140 to lens holder 111.

Magnet holder fixing part 141b has a shape corresponding to that of lower spring fixing part 121e of magnet holder 121. The positioning bosses of lower spring fixing parts 121e are fitted into the fixing holes of magnet holder fixing parts 141b to 144b, thereby positioning and fixing lower leaf spring 140 to magnet holder 121.

In translational shake-correcting movable part 100, Z-position detection part 160 (Hall element 161 and position detection board 162) is attached to magnet holder 121, and coupling yokes 124 and 125 are attached to yoke housing part (reference sign thereof omitted) of magnet holder 121. Upper elastic supporting part 130 is then attached to upper spring fixing parts 121c.

During the attachment, one end of each of power-source line parts 133 and 134 is electrically connected by soldering to the power source terminal of position detection board 162. One end of each of signal line parts 135 and 136, meanwhile, is electrically connected by soldering to the signal terminal of position detection board 162.

Lower leaf spring 140 is then attached to lower spring fixing parts (not illustrated) of lens holder 111. With this state maintained, lens holder 111 is fitted into magnet holder 121 from the image formation side in the optical axis direction. Subsequently, upper leaf springs 131 and 132 are attached to upper spring fixing parts 111e of lens holder 111, and lower leaf spring 140 is attached to lower spring fixing parts (not illustrated) of magnet holder 121.

During the attachment, coil connecting part 131h of upper leaf spring 131 is electrically connected by soldering to one end portion of AF coil part 112 tied to one of tying parts 111f of lens holder 111. Similarly, coil connecting part 132h of upper leaf spring 132 is electrically connected by soldering to the other end portion of AF coil part 112 tied to the other one of tying parts 111f of lens holder 111.

Permanent magnets 122A to 122D are then inserted into magnet holder 121 from the image formation side in the optical axis direction, and adhered thereto. At the same time, yoke part 124a, one of the yoke parts, of coupling yoke 124 is adhered to an end surface of permanent magnet 122A in the longitudinal direction, and yoke part 124b, the other one of the yoke parts, of coupling yoke 124 is adhered to an end surface of permanent magnet 122B in the longitudinal direction. Further, yoke part 125a, one of the yoke parts, of coupling yoke 125 is adhered to an end surface of permanent magnet 122C in the longitudinal direction, and yoke part 125b, the other one of the yoke parts, of coupling yoke 125 is adhered to an end surface of permanent magnet 122D in the longitudinal direction.

Auxiliary yoke part 123 is then attached to magnet holder 121 by fitting from the outside in the radial direction. Specifically, auxiliary yokes 123A to 123D are attracted to the outer side walls of permanent magnets 122A to 122D using an attraction force of permanent magnets 122A to 122D, thereby obtaining the state where engaging parts 123a are engaged with to-be-engaged parts 121h of magnet holder 121.

Figure 11:
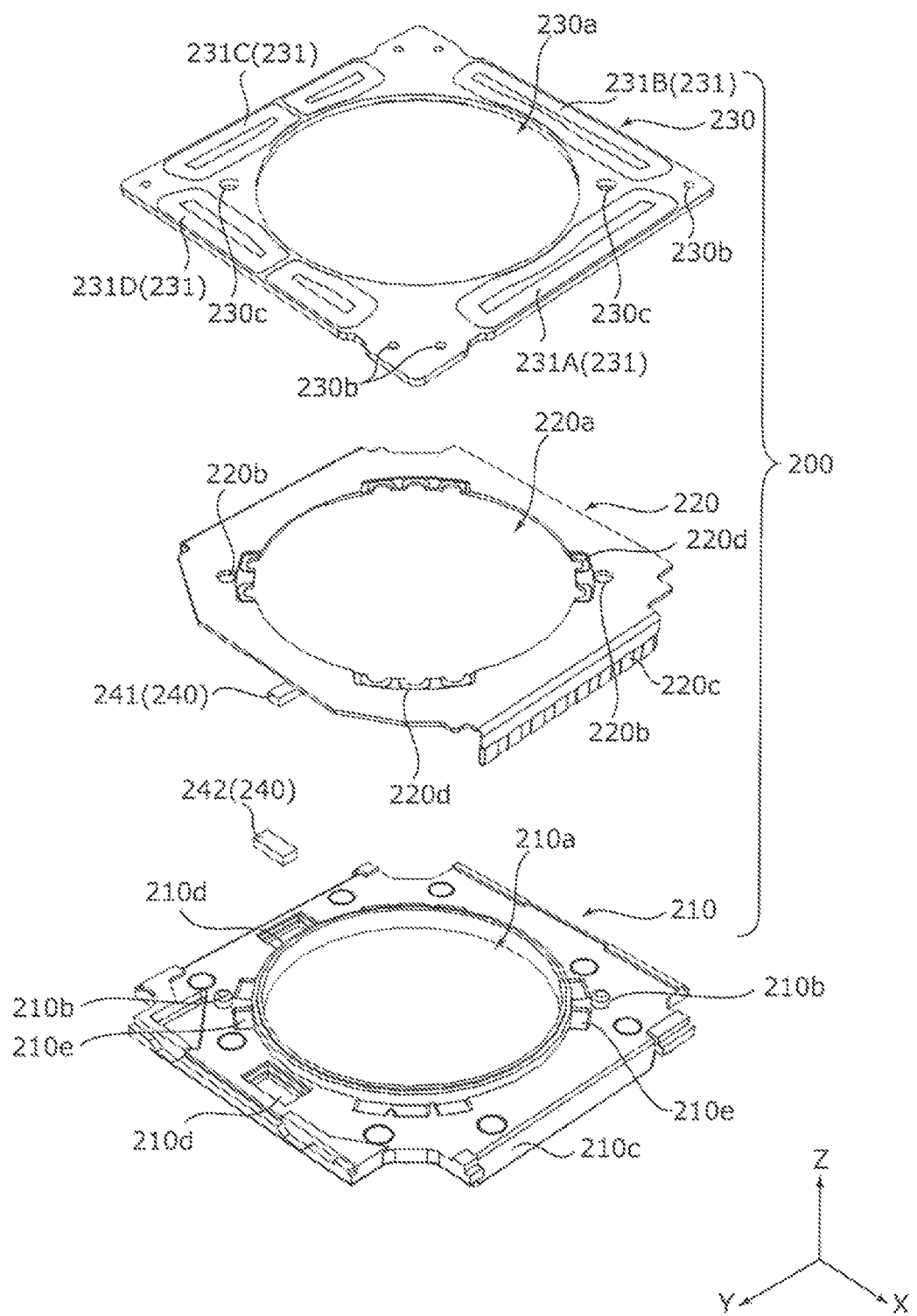
FIG. 11 is an exploded perspective view of a translational shake-correcting fixing part.

FIG. 11 is an exploded perspective view of translational shake-correcting fixing part 200. As illustrated in FIG. 11, translational shake-correcting fixing part 200 includes, for example, base 21, connection board 220, translational shake-correcting coil board 230 and XY-position detection part 240.

Base 210 is a member having a square shape in plan view, and has circular opening 210a in the center thereof. Base 210 includes, at the peripheral edge of opening 210a, positioning bosses 210b at positions corresponding to those of positioning holes 230c of translational shake-correcting coil board 230 and of positioning holes 220b of connection board 220.

Base 210 includes, at the peripheral edge thereof, recesses 210c at positions corresponding to those of control terminals 220c of connection board 220. Recess 210c is formed in a tapered shape expanding outward, toward the lower side. Base 210 also includes, at the peripheral edge of opening 210a, Hall element housing parts 210d for housing respective Hall elements 241 and 242, and terminal housing parts 210e for housing respective power source terminals 220d of connection board 220.

Translational shake-correcting coil board 230 is, as with base 210, a board having a square shape in plan view, and has circular opening 230a in the center thereof. Translational shake-correcting coil board 230 includes, at four corners thereof, wire fixing holes 230b for inserting the other ends (bottom ends) of suspension wires 300, respectively. Translational shake-correcting coil board 230 also includes, at the peripheral edge of opening 230a, positioning holes 230c at positions where a diagonal direction intersects the peripheral edge.

Translational shake-correcting coil board 230 includes translational shake-correcting coil part 231 at positions facing magnet part 122 in the optical axis direction. Translational shake-correcting coil part 231 includes four shift coils 231A to 231D corresponding to permanent magnets 122A to 122D. The size or disposition of shift coils 231A to 231D and permanent magnets 122A to 122D is set so that the magnetic fields radiated from the bottom surfaces of permanent magnets 122A to 122D cut across the longer sides of shift coils 231A to 231D in the Z direction, respectively.

Connection board 220 is, as with base 210, a board having a square shape in plan view, and has circular opening 220a in the center thereof. Connection board 220 includes, at the peripheral edge of opening 220a, positioning holes 220b at positions respectively corresponding to those of positioning holes 230c of translational shake-correcting coil board 230. Connection board 220 includes control terminals 220c formed so as to bend downward at respective two sides along the Y direction. Control terminals 220c are electrically connected to the image capturing part (not illustrated).

Connection board 220 includes, at four positions where the diagonal directions intersects the inner peripheral edge of opening 220a, power source terminals 220d for supplying power to translational shake-correcting coil part 231. Connection board 220 further includes a wiring pattern having power source lines (not illustrated) for supplying power to AF coil part 112 and translational shake-correcting coil part 231, and a signal line (not illustrated) for extracting a detection signal output from the XY-position detection part 240. On the back surface of connection board 220, disposed is XY-position detection part 240 for detecting the position of translational shake-correcting movable part 100 in the XY plane.

Detection part 240 is composed of, for example, Hall elements 241 and 242 (magnetic sensors) which detect the magnetic field using Hall effect. Hall elements 241 and 242 are disposed substantially at the centers in adjacent two sides of the undersides of connection board 220, respectively. Detecting the magnetic fields formed by magnet part 122 using Hall elements 241 and 242 can specify the position of translational shake-correcting movable part 100 in the XY plane. A XY-position detection magnet may be disposed in translational shake-correcting movable part 100 in addition to magnet part 122.

In translational shake-correcting fixing part 200, translational shake-correcting coil board 230 is bonded to connection board 220 by soldering. The bonding electrically connects translational shake-correcting coil part 231 to a power source line (not illustrated) of connection board 220.

The positioning bosses 210b of base 210 are fitted into positioning holes 230c of translational shake-correcting coil board 230 and positioning holes 220b of connection board 220, thereby placing translational shake-correcting coil board 230 and connection board 220 on base 210. Engaging control terminals 220c of connection board 220 with recesses 210c of base 210 fixes translational shake-correcting coil board 230 and connection board 220 to base 210.

In lens driving device 1, one ends of suspension wires 321 and 322 are respectively inserted into wire connecting part 132g of upper leaf spring 132 and wire connecting part 131g of upper leaf spring 131, and fixed thereto by soldering. One ends of suspension wires 311 and 312 are respectively inserted into wire connecting part 133c of power-source line part 133, and wire connecting part 134c of power-source line part 134, and fixed thereto by soldering. One ends of suspension wires 301 and 302 are respectively inserted into wire connecting part 135b of signal line part 135, and wire connecting part 136b of signal line part 136, and fixed thereto by soldering. The fixing electrically connects suspension wires 300 to upper leaf springs 131 and 132, power source line parts 133 and 134, and signal line parts 135 and 136.

Subsequently, the other ends (bottom ends) of suspension wires 300 are respectively inserted into wire fixing holes 230b of translational shake-correcting coil board 230, and fixed thereto by soldering. The fixing electrically connects suspension wires 300 to power source lines and signal lines of connection board 220. Power supplying to AF coil part 112 and Hall element 161, and operation control for Hall element 161 becomes thus possible via suspension wires 300 and upper elastic supporting part 130.

Dampers (not illustrated) are disposed in damper installation parts 121d (including upper portions of wire insertion parts 121a) of magnet holder 121 so as to surround suspension wires 300, respectively, thereby interposing the dampers between magnet holder 121 and upper leaf springs 131 and 132. Interposing the dampers (not illustrated) between magnet holder 121 and upper leaf springs 131 and 132 can reduce generation of unnecessary resonance (high-order resonance mode), thereby ensuring the stability of the operation. The damper can be readily applied to damper installation part 121d by using a dispenser. As the damper, ultraviolet curing silicone gel can be employed, for example.

In lens driving device 1, a current is applied to translational shake-correcting coil part 231, for translational shake correction. Specifically, in the translational shake-correcting driving part, the current for translational shake-correcting coil part 231 is controlled so as to cancel out the translational shake of camera module A based on the detection signal, which indicates translational shake, from shake detection part 44 (acceleration sensor). During the controlling, feeding back detection results from XY-position detection part 240 can accurately control the translational movement of translational shake-correcting movable part 100.

When the current is applied to translational shake-correcting coil part 231, a Lorentz force is generated at translational shake-correcting coil part 231 due to the interaction between the magnetic field of magnet part 122 and the current flowing through translational shake-correcting coil part 231 (Fleming's left hand rule). The direction of the Lorentz force is a direction (Y direction or X direction) orthogonal to the direction (Z direction) of the magnetic field in the longer side of translational shake-correcting coil part 231 and to the direction (X direction or Y direction) of the current. Since translational shake-correcting coil part 231 is fixed, a reactive force acts on magnet part 122. The reactive force serves as a driving force of the translational shake-correcting voice coil motor to sway, in the XY plane, translational shake-correcting movable part 100 including magnet part 122, thereby performing translational shake correction.

In lens driving device 1, a current is applied to angular shake-correcting coil part 23, for angular shake correction. Specifically, in the angular shake-correcting driving part, the current for angular shake-correcting coil part 23 is controlled so as to cancel out the angular shake of camera module A based on the detection signal, which indicates angular shake, from shake detection part 44 (gyro sensor). During the controlling, feeding back detection results from angle detection part 25 can accurately control the rotational swaying of angular shake-correcting movable part 10.

When a current is applied to angular shake-correcting coil part 23, a Lorentz force is generated at angular shake-correcting coil part 23 due to the interaction between the magnetic field of angular shake-correcting magnet part 12 and the current flowing through angular shake-correcting coil part 23 (Fleming's left hand rule). The direction of the Lorentz force is a direction (Z direction) orthogonal to the direction (X direction or Y direction) of the magnetic field in the longer side of angular shake-correcting coil part 23 and to the direction (Y direction or X direction) of the current. Since angular shake-correcting coil part 23 is fixed, a reactive force acts on angular shake-correcting magnet part 12. The reactive force serves as a driving force of the angular shake-correcting voice coil motor to rotationally sway, about the X- or Y-axis, angular shake-correcting movable part 10 including angular shake-correcting magnet part 12, thereby performing angular shake correction.

Applying currents in opposite directions to respective tilt coils 23A and 23C which face each other in Y direction generates forces opposite to each other in the Z direction on permanent magnets 12A and 12C. Accordingly, angular shake-correcting movable part 10 including image capturing module 14 rotationally sways about the X-axis with central part 30a of angular shake-correcting supporting part 30 as the fulcrum. Similarly, when applying currents in opposite directions to respective tilt coils 23B and 23D which face each other in X direction, angular shake-correcting movable part 10 including image capturing module 14 rotationally sways about the Y-axis with central part 30a of angular shake-correcting supporting part 30 as the fulcrum. Angular shake-correcting movable part 10 rotationally sways until the driving force of angular shake-correcting voice coil motor (force which acts on angular shake-correcting magnet part 12) is balanced with the restoring force of angular shake-correcting supporting part 30. The deviation of the optical axis due to angular shake is thus corrected, and the optical axis direction remains constant.

In lens driving device 1, a current is applied to AF coil part 112, for automatic focusing. When the current is applied to AF coil part 112, a Lorentz force is generated at AF coil part 112 due to the interaction between the magnetic field of magnet part 122 and the current flowing through AF coil part 112. The direction of the Lorentz force is a direction (Z direction) orthogonal to the direction (X direction or Y direction) of the magnetic field and to the direction (Y direction or X direction) of the current flowing through AF coil part 211. Since magnet part 122 is fixed, a reactive force acts on AF coil part 112. The reactive force serves as a driving force of the voice coil motor for AF to move, in the optical axis direction, AF movable part AF 110 including AF coil part 112, thereby performing focusing.

In the AF driving part of lens driving device 1, a closed loop control is performed based on a detection signal of Z-position detection part 160. The closed loop control method does not need to take the hysteresis characteristics of the voice coil motor into account, and can directly detect the position of AF movable part 110 being stabilized. The automatic focusing in an image surface detection method can also be performed. Accordingly, the speed of the automatic focusing operation may become higher with high responsiveness.

During a non-energization state where no automatic focusing is performed, AF movable part 110 is suspended between the infinity position and the macro position by lower leaf spring 140 and upper leaf springs 131 and 132 (hereinafter referred to as "reference state"). That is, in translational shake-correcting movable part 100, AF movable part 110 (lens holder 111) is elastically supported by lower leaf spring 140 and upper leaf springs 131 and 132 in such a way that AF movable part 110 can change its position from side to side in the Z direction while the position thereof relative to AF fixing part 120 (magnet holder 121) is set.

During the focusing, the direction of the current is controlled based on whether AF movable part 110 is moved from the reference state toward the macro position side or toward the infinity position side. The value of the current is controlled based on the movement length of AF movable part 110.

When AF movable part 110 moves toward the infinity position side during the focusing, the undersides of protrusions 111d of lens holder 111 approach the top surface of magnet part 122, and finally makes contact with the top surface. That is, the movement toward the infinity position side is restricted by the undersides of protrusions 111d of lens holder 111 and the top surface of magnet part 122.

When AF movable part 110, meanwhile, moves toward the macro position side during the focusing, the top surfaces of protrusions 111d of lens holder 111 approach the undersides of stopper parts 121b of magnet holder 121, and finally makes contact with the undersides. That is, the movement toward the macro position side is restricted by the top surfaces of protrusions 111d of lens holder 111 and the undersides of stopper parts 121b of magnet holder 121.

As described above, lens driving device 1 includes an image capturing part (not illustrated) for capturing a subject image which is imaged using lens part 2; a translational shake-correcting driving part which performs the translational shake correction by swaying lens part 2 in a plane orthogonal to the optical axis based on a detection signal from shake detection part 44 (translational shake detection part) which detects a translational shake; and an angular shake-correcting driving part which performs the angular shake correction by integrally tilting the image capturing part (not illustrated) and the translational shake-correcting driving part based on a detection signal from shake detection part 44 (angular shake detection part) which detects an angular shake.

Specifically, the translational shake-correcting driving part in lens driving device 1 includes: magnet part 122 (translational shake-correcting magnet part) disposed around lens part 2; translational shake-correcting coil part 231 disposed separately from magnet part 122 in the optical axis direction; and suspension wires 300 (translational shake-correcting supporting part) which support translational shake-correcting movable part 100 including magnet part 122 so that translational shake-correcting movable part 100 can sway relative to translational shake-correcting fixing part 200 including translational shake-correcting coil part 231. The translational shake-correcting driving part corrects a translational shake by using the driving force of a voice coil motor composed of translational shake-correcting coil part 231 and magnet part 122.

The angular shake-correcting driving part in lens driving device 1 includes: angular shake-correcting magnet part 12 disposed around lens part 2; angular shake-correcting coil part 23 disposed separately from angular shake-correcting magnet part 12 in the optical axis direction; and angular shake-correcting supporting part 30 which supports angular shake-correcting movable part 10 including image capturing module 14 (image capturing part (not illustrated) translational shake-correcting driving part) and angular shake-correcting magnet part 12 so that angular shake-correcting movable part 10 can be tilted relative to angular shake-correcting fixing part 20 including angular shake-correcting coil part 23. The angular shake-correcting driving part corrects an angular shake by using the driving force of a voice coil motor composed of angular shake-correcting coil part 23 and angular shake-correcting magnet part 12.

Lens driving device 1 also includes an AF driving part which includes AF coil part 112 disposed around lens part 2; magnet part 122 (auto-focusing magnet part) disposed separately from AF coil part 112 in the radial direction; and upper elastic supporting part 130 and a lower elastic supporting part (supporting part for automatic focusing (also referred to as "auto-focusing supporting part")) which support AF movable part 110 including AF coil part 112 so that AF movable part 110 can move in the optical axis direction relative to AF fixing part 120 including magnet part 122. The AF driving part performs automatic focusing by using the driving force of a voice coil motor composed of AF coil part 112 and magnet part 122.

Lens driving device 1 is capable of correcting not only an angular shake but also a translational shake. Specifically, an angular shake is corrected by an angular shake-correcting driving part of the tilt method, and a translational shake is corrected by a translational shake-correcting driving part of the shift method, and therefore, even for high-magnification image capturing, such as macro photographing, a high-quality captured image free from distortion at the four corners thereof can be obtained. The present invention can simplify the control for shake correction, and readily adjust or evaluate each driving part. Further, as a shake can be corrected efficiently, the speed of automatic focusing may become higher, and focus accuracy may be improved.

In addition, when trying to correct both the angular shake and translational shake by using either one of shake-correcting driving parts of the tilt method and of the shift method, the movable range of the shake-correcting driving part should be made larger, thereby possibly increasing the size of a device. However, lens driving device 1 according to the embodiment can become workable in size substantially the same as that of conventional devices.

While the invention made by the present inventor has been specifically described based on the embodiments, it is not intended to limit the present invention to the above-mentioned embodiments but the present invention may be further modified within the scope and spirit of the invention defined by the appended claims.

The embodiment discloses, for example, a lens driving device employing a moving magnet method for the angular shake-correcting driving part and the translational shake-correcting driving part thereof; however, the present invention encompasses a lens driving device employing a moving coil method for either one of the angular shake-correcting driving part and the translational shake-correcting driving part thereof. The embodiment also discloses, for example, a lens driving device employing a moving coil method for the AF driving part thereof; however, the present invention encompasses a lens driving device provided with an AF driving part of the moving magnet method.

Further, the embodiment describes lens driving device 1 of the so-called moving magnet method, in which angular shake-correcting fixing part 20 includes angular shake-correcting coil part 23 and angular shake-correcting movable part 10 includes angular shake-correcting magnet part 12. However, the present invention can be employed for a lens driving device of the so-called moving coil method, in which an angular shake-correcting fixing part includes an angular shake-correcting magnet part and an angular shake-correcting movable part includes an angular shake-correcting coil part. In such a device, a yoke would be disposed in the angular shake-correcting fixing part.

In the embodiment, two pairs of tilt coil 23A and permanent magnet 12A, and tilt coil 23C and permanent magnet 12C are disposed as a voice coil motor for rotationally swaying angular shake-correcting movable part 10 about the X-axis; and two pairs of tilt coil 23B and permanent magnet 12B, and tilt coil 23D and permanent magnet 12D are disposed as a voice coil motor for rotationally swaying angular shake-correcting movable part 10 about the Y-axis; however the disposition of at least each one pair is sufficient.

While smartphone M, a camera-equipped mobile terminal, is described in the embodiment as an example of the camera-mounted device having camera module A, the present invention can also be employed for a camera-mounted device that is an information device or transporting device. The camera-mounted device that is an information device includes camera module A and a control part for processing image information obtained from camera module A. Examples of such camera-mounted devices include camera-equipped mobile phones, note-type personal computers, tablet terminals, mobile game machines, web cameras, and camera-equipped onboard devices (e.g., rear monitoring devices and drive recorders). The camera-mounted device that is a transporting device includes camera module A and a control part for processing an image obtained from camera module A. Examples of such camera-mounted devices include vehicles.

Figure 12A:
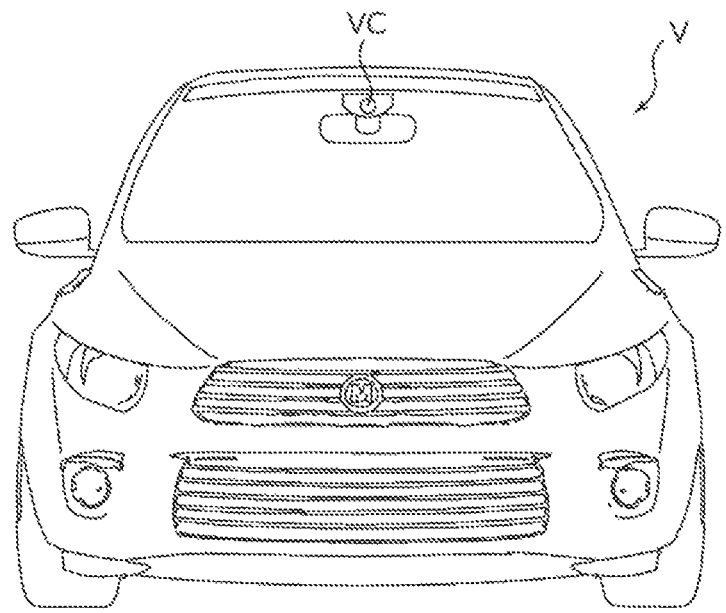
FIGS. 12A and 12B illustrate an automobile as a camera-mounted device which has an onboard camera module mounted therein.
Figure 12B:
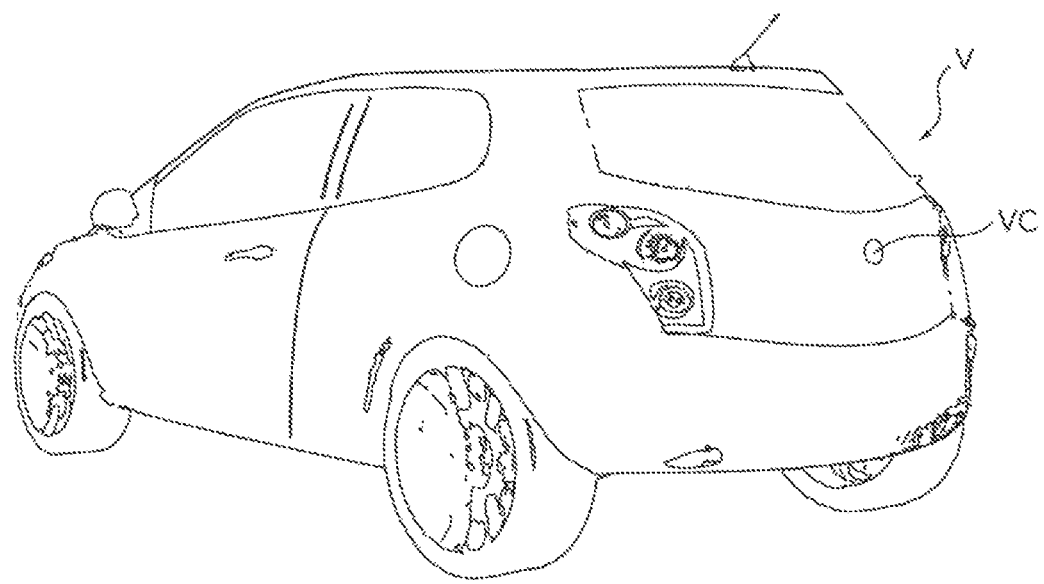

FIGS. 12A and 12B illustrate vehicle V, as a camera-mounted device, having onboard camera module VC (Vehicle Camera) mounted therein. FIG. 12A is a front view of vehicle V and FIG. 12B is a rear perspective view of vehicle V. Vehicle V includes camera module A described in the embodiment mounted therein as onboard camera module VC. As illustrated in FIGS. 12A and 12B, onboard camera module VC is attached, for example, on the windshield to face forward, or on the rear gate to face backward. Such onboard camera module VC may be used for, for example, rear monitoring, drive recording, collision avoidance control and automatic drive control.

The embodiment disclosed herein is merely an exemplification in every aspect and should not be considered as limitative. The scope of the present invention is specified by the claims, not by the above-mentioned description. The scope of the present invention is intended to include all modifications in so far as they are within the scope of the appended claims or the equivalents thereof.

This application is entitled to and claims the benefits of Japanese Patent Application No. 2015-224003 dated Nov. 16, 2015, the disclosures of which including the specification, drawings and abstract are incorporated herein by reference in its entirety.

REFERENCE SIGNS LIST

1 Lens driving device
2 Lens part
3 Cover
4 Rigid flexible printed wiring board
10 Angular shake-correcting movable part
11 Yoke
12 Angular shake-correcting magnet part
13 Module guide part
14 Image capturing module
20 Angular shake-correcting fixing part
21 Base
22 Angular shake-correcting coil board
23 Angular shake-correcting coil part
24 Skirt
25 Angle detection part
30 Angular shake-correcting supporting part
100 Translational shake-correcting movable part
110 AF movable part
111 Lens holder
112 AF coil part
120 AF fixing part
121 Magnet holder
122 Magnet part (AF magnet part, Translational shake-correcting magnet part)
123 Auxiliary yoke part
124, 125 Coupling yoke
130 Upper elastic supporting part (Supporting part for AF)
140 Lower elastic supporting part (Supporting part for AF)
150 Position detection magnet
160 Z-position detection part
200 Translational shake-correcting fixing part
210 Base
220 Connection board
230 Translational shake-correcting coil board
231 Translational shake-correcting coil part
240 XY-position detection part
300 Translational shake-correcting supporting part
A Camera module
M Smartphone (Information device)

The invention claimed is:

1. A lens driving device comprising:
an imaging device configured to capture a subject image which is imaged using a lens part;
a translational shake-correcting driving part which includes:
a translational shake-correcting fixing part,
a translational shake-correcting movable part moving relative to the translational shake-correcting fixing part, and
a translational shake-correcting supporting part supporting the translational shake-correcting movable part so that the translational shake-correcting movable part is allowed to sway relative to the translational shake-correcting fixing part, and
the translational shake-correcting driving part configured to correct a translational shake by driving the translational shake-correcting movable part and swaying the lens part in a plane orthogonal to an optical axis based on a detection signal from a translational shake detection part for detecting the translational shake;
an angular shake-correcting driving part which includes:
an angular shake-correcting fixing part,
an angular shake-correcting movable part moving relative to the angular shake-correcting fixing part, and
an angular shake-correcting supporting part supporting the angular shake-correcting movable part, and
the angular shake-correcting driving part configured to correct an angular shake by driving the angular shake-correcting movable part and integrally tilting the imaging device and the translational shake-correcting driving part based on a detection signal from an angular shake detection part for detecting the angular shake; and an image capturing module-printed wiring board on which the imaging device and the translational shake-correcting driving part are mounted, and which electrically connects a printed wiring board of a camera module and, the imaging device and the translational shake-correcting driving part, wherein:

the angular shake-correcting fixing part is fixed to the printed wiring board such that the angular shake-correcting fixing part is incapable of moving, and the translational shake-correcting fixing part, the translational shake-correcting movable part and the translational shake-correcting supporting part are configured to be included in the angular shake-correcting movable part.

2. The lens driving device according to claim 1, wherein:

the translational shake-correcting driving part includes:

a translational shake-correcting magnet part included the translational shake-correcting movable part and disposed around the lens part, and a translational shake-correcting coil part included the translational shake-correcting fixing part and disposed separately from the translational shake-correcting magnet part, wherein:

the translational shake-correcting driving part is configured to correct the translational shake by using a driving force of a voice coil motor composed of the translational shake-correcting coil part and the translational shake-correcting magnet part;

the angular shake-correcting supporting part supports the angular shake-correcting movable part including the imaging device, the translational shake-correcting driving part and the angular shake-correcting magnet part so that the angular shake-correcting movable part is allowed to tilt relative to the angular shake-correcting fixing part;

the angular shake-correcting driving part includes:

an angular shake-correcting magnet part included the angular shake-correcting movable part and disposed around the lens part, and an angular shake-correcting coil part included the angular shake-correcting fixing part and disposed separately from the angular shake-correcting magnet part, wherein:

the angular shake-correcting driving part is configured to correct the angular shake by using a driving force of a voice coil motor composed of the angular shake-correcting coil part and the angular shake-correcting magnet part.

3. The lens driving device according to claim 1, further comprising:

the translational shake detection part and the angular shake detection part.

4. The lens driving device according to claim 1, further comprising:

an auto-focusing driving part which includes:

an auto-focusing coil part disposed around the lens part, an auto-focusing magnet part disposed separately from the auto-focusing coil part, and an auto-focusing supporting part which supports an auto-focusing movable part including the auto-focusing coil part so that the auto-focusing movable part is movable in a direction of the optical axis relative to an auto-focusing fixing part including the auto-focusing magnet part, wherein:

the auto-focusing driving part is configured to automatically focus by using a driving force of a voice coil motor composed of the auto-focusing coil part and the auto-focusing magnet part.

5. A camera module comprising:

a lens part; and the lens driving device according to claim 1.

6. A camera-mounted device which is an information device or a transporting device, the camera-mounted device comprising:

the camera module according to claim 5.

* * * * *